(12) United States Patent
Chan et al.

(10) Patent No.: US 10,383,086 B2
(45) Date of Patent: Aug. 13, 2019

(54) FACILITATION OF INDOOR LOCALIZATION AND FINGERPRINT UPDATES OF ALTERED ACCESS POINT SIGNALS

(71) Applicant: The Hong Kong University of Science and Technology, Kowloon, Hong Kong (CN)

(72) Inventors: Shueng Han Gary Chan, Hong Kong (CN); Suining He, Hong Kong (CN)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 0 days.

(21) Appl. No.: 15/777,609

(22) PCT Filed: Nov. 17, 2016

(86) PCT No.: PCT/CN2016/106198
§ 371 (c)(1),
(2) Date: May 18, 2018

(87) PCT Pub. No.: WO2017/084596
PCT Pub. Date: May 26, 2017

(65) Prior Publication Data
US 2018/0332558 A1    Nov. 15, 2018

Related U.S. Application Data

(60) Provisional application No. 62/386,137, filed on Nov. 19, 2015.

(51) Int. Cl.
*H04W 24/00* (2009.01)
*H04W 64/00* (2009.01)
(Continued)

(52) U.S. Cl.
CPC ......... *H04W 64/006* (2013.01); *G01S 5/0252* (2013.01); *H04B 17/318* (2015.01);
(Continued)

(58) Field of Classification Search
CPC ..... H04W 64/00; H04W 16/18; H04W 4/023; H04W 4/029; H04W 64/003
See application file for complete search history.

(56) References Cited

U.S. PATENT DOCUMENTS 8,463,291 B2    6/2013  Mirowski et al.
8,548,497 B2   10/2013  Lymberopoulos et al.
(Continued)

FOREIGN PATENT DOCUMENTS

CN    102638888 A     8/2012
CN    103442430 A    12/2013
(Continued)

OTHER PUBLICATIONS

International Search Report for PCT Application No. PCT/CN2016/106198, dated Feb. 3, 2017, 4 pages.
(Continued)

*Primary Examiner* — Khalid W Shaheed
(74) *Attorney, Agent, or Firm* — Armin, Turocy & Watson, LLP

(57) ABSTRACT

When access point signals are altered, conventional fingerprint-based indoor localization techniques are note accuracy. Localization with altered access point and fingerprint updating can achieves accurate indoor localization and automatically update a fingerprint database with altered access points. Using subset sampling, the system detect the altered access points, filter them out by a received signal strength vector and find the location of a client. Given the received signal strength vectors received and the estimated location, the system can update a fingerprint database with the signal
(Continued)

changes by applying a non-parametric Gaussian process regression method.

20 Claims, 30 Drawing Sheets

(51) Int. Cl.
*G01S 5/02* (2010.01)
*H04B 17/318* (2015.01)
*H04W 24/02* (2009.01)

(52) U.S. Cl.
CPC ........... *H04W 24/02* (2013.01); *H04W 64/00* (2013.01); *H04W 64/003* (2013.01)

(56) References Cited

U.S. PATENT DOCUMENTS

| | | | |
|---|---|---|---|
| 9,301,400 B2* | 3/2016 | Kim | H05K 3/1275 |
| 9,544,923 B2 | 1/2017 | Gupta et al. | |
| 2006/0240840 A1* | 10/2006 | Morgan | G01S 5/02 455/456.1 |
| 2012/0172051 A1* | 7/2012 | Jeong | G01S 1/70 455/456.1 |
| 2013/0065615 A1* | 3/2013 | Jeong | H04W 64/00 455/456.6 |
| 2014/0195149 A1* | 7/2014 | Yang | G01S 5/0252 701/445 |

FOREIGN PATENT DOCUMENTS

| | | |
|---|---|---|
| CN | 103874118 A | 6/2014 |
| CN | 103945428 A | 7/2014 |
| CN | 104869536 A | 8/2015 |
| WO | 2014093533 A2 | 6/2014 |
| WO | 2014/198898 A2 | 12/2014 |

OTHER PUBLICATIONS

Lin, W, "Indoor localization and fingerprint update with altered access points", Master's thesis, Department of CSE, The Hong Kong University of Science and Technology, 2015. 62 pages.
He, et al. "Indoor Localization and Automatic Fingerprint Update with Altered AP Signals" IEEE Transactions on Mobile Computing (vol. 16, Issue: 7, Jul. 2017) 14 pages.
Bahl et al., "RADAR: An In-Building RF-based User Location and Tracking System" in Proc. IEEE INFOCOM, vol. 2, 2000, pp. 775-784.
Youssef et al., "The Horus WLAN Location Determination System" in Proc. ACM MobiSys, 2005, pp. 205-218.
Han et al. "Cosine similarity based fingerprinting algorithm in WLAN indoor positioning against device diversity" in Proc. IEEE ICC, 2015, 5 pages.
Liu et al., "Feedback Mechanism Based Dynamic Fingerprint Indoor Localization Algorithm in Wireless Sensor Networks", College of Computer Science and Electric Engineering, pp. 674-687.
Wu et al., "CSI-based Indoor Localization", IEEE Trans. Parallel and Distributed Systems, vol. 24, No. 7, Jul. 2013, pp. 1300-1309.
Shu et al., "Last-mile navigation using smartphones" in Proc. ACM MobiCom, 2015, pp. 512-524.

Feng et al., "Received Signal Strength based Indoor Positioning using Compressive Sensing", IEEE Trans. Mobile Computing, vol. 11, No. 12, Dec. 2012, pp. 1983-1993.
Xiang et al., "Calibrate without calibrating: An iterative approach in participatory sensing network" IEEE Trans. Parallel and Distributed Systems, vol. 26, No. 2, Feb. 2015, pp. 351-361.
Li et al., "Experiencing and Handling the Diversity in Data Density and Environmental Locality in an Indoor Positioning Service" in Proc. ACM MobiCom, 2014, pp. 459-470.
Liu et al., "Survey of Wireless Indoor Positioning Techniques and Systems", IEEE Trans. Systems, Man, and Cybernetics, Part C: Applications and Reviews, vol. 37, No. 6, Nov. 2007, pp. 1067-1080.
Han et al., "Building a practical Wi-Fi-based indoor navigation system", IEEE Pervasive Computing, vol. 13, No. 2, pp. 72-79, 2014.
Mirowski et al., "Probabilistic Radio-Frequency Fingerprinting and Localization on the Run", Bell Labs Technical Journal, vol. 18, No. 4, 2014, pp. 111-133.
Ferris et al., "Gaussian Processes for Signal Strength-Based Location Estimation", in Proc. Robotics: Science and Systems, 2006.
Biaz et al., "ARIADNE: A dynamic indoor signal map construction and localization system", in Proc. ACM MobiSys, 2006, pp. 151-164.
Frey et al., "Clustering by passing messages between data points", Science, vol. 315, No. 5814, 2007, pp. 972-976.
Yang et al., "FreeLoc: Calibration-free crowdsourced indoor localization", in Proc. IEEE INFOCOM, 2013, pp. 2481-2489.
Park et al., "Growing an Organic Indoor Location System", in Proc. ACM MobiSys, 2010, pp. 271-284.
Wang et al., "No Need to War-Drive:Unsupervised Indoor Localization", in Proc. ACM MobiSys, 2012, pp. 197-210.
Atia et al., "Dynamic online-calibrated radio maps for indoor positioning in wireless local area networks", IEEE Trans. Mobile Computing, vol. 12, No. 9, Sep. 2013, pp. 1774-1787.
Yin et al., "Learning adaptive temporal radio maps for signal-strength-based location estimation", IEEE Trans. Mobile Computing, vol. 7, No. 7, 2008, pp. 869-883.
Sun et al., "Adaptive localization through transfer learning in indoor Wi-Fi environment", in Proc. IEEE ICMLA, 2008, pp. 331-336.
Zheng et al., "Transferring localization models over time", in Proc. AAAI, vol. 3, 2008, pp. 1421-1426.
Brooks et al., "Gaussian process models for indoor and outdoor sensor-centric robot localization" IEEE Trans. Robotics, vol. 24, No. 6, Dec. 2008, pp. 1341-1351.
Ferris et al., "WiFi-SLAM using Gaussian process latent variable models", in Proc. IJCAI, vol. 7, 2007, pp. 2480-2485.
Shin et al., "MRI: Model-based radio interpolation for indoor war-walking", IEEE Trans. Mobile Computing, vol. 14, No. 6, Jun. 2015, pp. 1231-1244.
He et al., "Chameleon: Survey-free updating of fingerprint database for indoor localization", IEEE Pervasive Computing, vol. 15, No. 4, Oct.-Dec. 2016, pp. 66-75.
McHutchon et al., "Gaussian process training with input noise", in Proc. NIPS, 2011, 9 pages.
Rasmussen et al., "Gaussian Processes for Machine Learning", The MIT Press, 2006. 266 pages.
Wu, et al. "WILL: Wireless indoor localization without site survey", IEEE Trans. Parallel and Distributed Systems, vol. 24, No. 4, pp. 839-848, 2013.

\* cited by examiner

FACILITATION OF INDOOR LOCALIZATION AND FINGERPRINT UPDATES OF ALTERED ACCESS POINT SIGNALS

RELATED APPLICATION

This application is a United States National Phase Application of, and claims priority to each of, patent cooperation treaty (PCT) Application No. PCT/CN2016/106198, filed Nov. 17, 2016, and entitled "FACILITATION OF INDOOR LOCALIZATION AND FINGERPRINT UPDATES OF ALTERED ACCESS POINT SIGNALS," which claims priority to U.S. Provisional Patent No. 62/386,137, filed Nov. 19, 2015, and entitled "INDOOR LOCALIZATION AND AUTOMATIC FINGERPRINT UPDATE UNDER ALTERED AP SIGNALS," the respective entireties of which applications are hereby expressly incorporated herein by reference.

TECHNICAL FIELD

This disclosure relates generally to facilitating indoor localization of access point signals. More specifically, this disclosure relates to fingerprint updates of access point signals.

BACKGROUND

Indoor location-based services (LBS) including Wi-Fi fingerprinting is a growing field. There are typically two phases in fingerprint-based localization, namely offline site survey and online location query. In the offline phase, a site survey is conducted to collect the fingerprints at known physical locations called reference points (RPs). Each fingerprint is a vector of received signal strength (RSS) values from Wi-Fi access points (APs). The RSS values and their associated locations are then stored in a fingerprint database. In the online phase, a mobile client (target) measures the RSS values at its location. Upon receiving the client measurement, the server matches it with its database to return the client location.

The accuracy of fingerprinting depends on how close the fingerprint database matches with the current signal environment. However, AP signals can change over time due to unexpected AP movement, power adjustment, introduction or removal of wall partitioning, wearing, etc. If such signal change is not reflected in the fingerprint database, localization accuracy would be adversely affected.

The above-described background relating to a Wi-Fi fingerprinting is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
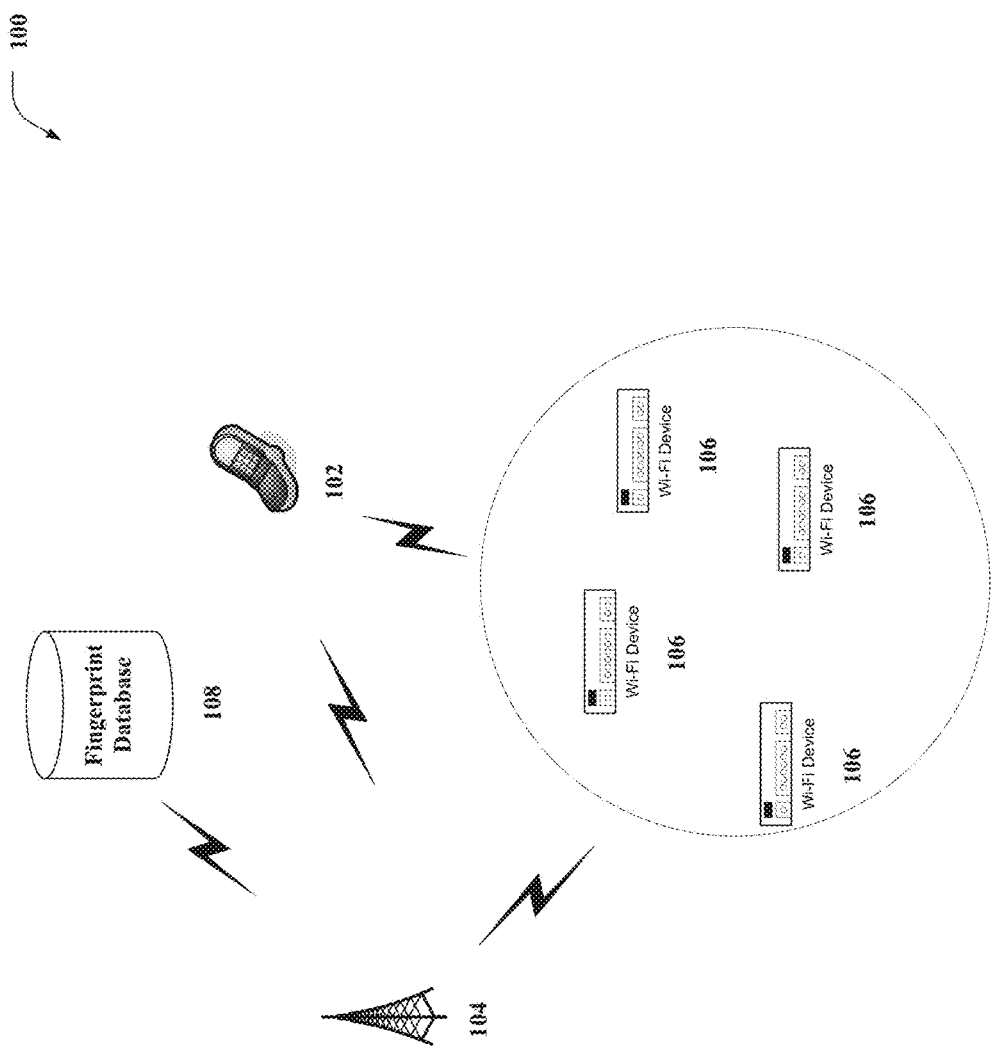
FIG. 1 illustrates an example wireless network comprising a localization with altered access points and fingerprint updating according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate indoor localization and fingerprint updates of altered access point signals. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

Described herein are systems, methods, articles of manufacture, and other embodiments or implementations that can facilitate indoor localization and fingerprint updates of altered access point signals. Facilitating indoor localization and fingerprint updates of altered access point signals can be implemented in connection with any type of device with a connection to the communications network such as: a mobile handset, a computer, a handheld device, or the like.

Access point (AP) signals of AP's can evolve over time. The number of altered AP signals, at a location, can be small compared with a total number of APs at the location. Therefore if a received signal strength (RSS) vector does not comprise altered APs, then their estimations would be close to the true location. On the other hand, for vectors comprising altered APs, the estimations tend to be dispersed.

Consequently, localization with altered APs and fingerprint updating (LAAFU) can be performed to provide a truer value of AP locations. LAFFU can achieves accurate indoor localization and automatic fingerprint updates in the presence of altered APs without the need of extra site surveys. With an implicit crowdsourcing approach, LAAFU can transparently adapt the reference (RP) fingerprint of the altered Aps by first, identifying whether there are any altered APs in the RSS vector by utilizing a fast detection algorithm. If no such AP is detected, a fingerprint-based localization algorithm can be run. Otherwise, using subset sampling and a efficient clustering algorithm, LAAFU can filter out the altered APs and determine the client location. Then, LAAFU can employ a non-parametric Gaussian regression process to update the RP fingerprints.

As altered APs may not be frequent in target measurements, a detection algorithm can be leveraged to identify the existence of altered APs by partitioning the RSS vector into multiple subsets and checking the dispersiveness of these estimations. The detection algorithm can reduce unnecessary computation and hence speeds up the LAAFU. A versatile cluster-based localization can be used to accurately identify a dense cluster and accurately locate the target. The algorithm can be adaptive to inputs, requiring no initial pre-set cluster number, and employ a weighting methodology to identify dense clusters based on signal similarity and cluster size.

A fingerprint updating methodology can be based on a Gaussian process (GP) and crowdsourcing. In contrast to previous work, This methodology makes use of target locations, anywhere in the area; therefore the targets do not have to be close to the RPs. Given crowdsourced RSSs and their locations, the GP can regress the signal values to reflect the current environment. Consequently, the LAAFU is able to update the fingerprint database according based on implicit user feedback in an adaptive and timely manner. It should be understood that although this is in the context of Wi-Fi fingerprinting, the LAAFU can be used with any fingerprint signal, any localization algorithm, and any device calibration methodology.

A true positive rate can be denoted by the number of correctly classified cases that there are altered APs as, TP, and the number of incorrect decisions that actually exist can be denoted by, FN. Therefore, the true positive rate (TPR) of a fast detection can be represented by the portion of true positives, which are correctly classified as positive (altered), i.e.:

$$TPR = \frac{TP}{TP + FN}. \quad \text{Equation (1)}$$

If TN is the number of negative cases, which are correctly predicted as negative, and FP is the number of positive cases, which are incorrectly classified, then the true negative rate (TNR) can measure the proportion of negatives, which are correctly identified as unaltered, i.e.:

$$TNR = \frac{TN}{TN + FP}. \quad \text{Equation (2)}$$

PC can be defined as the number of positive cases that altered APs actually exist, and NC can be defined as the number of negative ones where no altered APs exist. Thus, the accuracy of fast detection can be given by:

$$ACC = \frac{TP + TN}{PC + NC}. \quad \text{Equation (3)}$$

A localization error can be measured by a Euclidean distance between the estimated location and the target's true location. Mean localization error can be calculated as the average of the errors in estimating all targets. A signal prediction error, for signal update accuracy, can be measured by calculating an absolute difference between predicted RSS and ground truth value at every RP. The average mutual Euclidean distance can be calculated by finding all pairwise distances between the locations estimated with RSS subsets and calculating their mean. This can reflect the inconsistency between fingerprints and target signals. If this distance is smaller than the predefined threshold $\gamma$ in the fast detection, then the fingerprint database has been successfully updated.

TPR, TNP and ACC can also be used to evaluate signal update decisions Here, TP (TN) can be the number of correct decisions that APs are actually altered and should be updated (unaltered and with no update). FP (FN) can be the number of incorrect decisions that APs are indeed unaltered but not necessarily updated (altered but with no update). Furthermore, to evaluate the updated fingerprint quality, a weighted k-nearest neighbor (WKNN) localization of targets against different fingerprint databases can comprise: (1) an original database without updated RSSs of altered APs; (2) a ground truth database, which comprises RSSs of altered APs; (3) a fingerprint database updated by LAAFU GP regression; and (4) a fingerprint database updated by long distance path loss (LDPL). From WKNN localization errors, it can be determined whether the database has adapted to the environment with a certain signal prediction arrangement.

LAAFU can estimate whether there is an altered AP signal or not in the RSS vector as measured by a client. If not, the location can be estimated as usual. Otherwise, the LAAFU can moves to the next phase, localization with altered APs, to locate the client. Due to the adaptive and efficient fingerprint update in LAAFU, altered APs do not occur frequently. Such fast initial diagnosis on altered APs hence greatly speeds up client localization.

Because AP alteration can occur over a relatively large time span, it is unnecessary to execute the phase of localization with altered APs, which has higher computational costs. Therefore, a fast detection can detect the presence of altered Aps early in each location query.

TABLE 1

LAAFU Symbols.

| Notation | Definition |
| --- | --- |
| V | RSS vector measured by client |
| $AP_i$ | MAC address of $AP_i$ |
| A | MAC of APs detected by client |
| $A_s$ | MAC address subset vector from A |
| $V_s$ | RSS subset vector generated based on $A_s$ |
| l | Physical location |
| $F_j$ | Fingerprint, RSS vector measured at $RP_j$ |
| $v_{ij}$ | RSS value received from $AP_i$ at $RP_j$ |
| k | Number of neighbors in WKNN |
| γ | Distance threshold in Fast Detection |
| P | Number of APs in the whole site |
| R | Number of RPs in the whole site |
| M | Number of RSS subset vectors generated |
| Q | Number of nearest RPs used in cluster similarity |
| b | Bandwidth used in penalty term |
| W | Update interval for fingerprint database update |
| N | Training data size for signal regression |
| κ | Variance factor used in fingerprint database update |
| λ | Fingerprint database update weight |

Specifically, if $v_i$ is the target-measured RSS (mW) from $AP_i$, then the measured RSS vector at the target can be defined as:

$$V=\{v_1,v_2,K,v_i,v_P\},\quad\text{Equation (4)}$$

where $1 \le i \le P$ and P is the total number of APs in the site of interest. Note that $v_i=0$ if the target does not detect AP i.

In order to generate one RSS subset vector, LAAFU can first extract the APs, which can be detected by the client at that location. Let A be a set of MAC addresses, where $$AP_i \in A,\quad\text{Equation (5)}$$

iff $v_i>0$. Then LAAFU can construct a subset of all MAC addresses (set of APs) indexed by s, i.e., $$A_s \subseteq A,\quad\text{Equation (6)}$$

where $A_s \ne \emptyset$. RSS subset vector $V_s$ is hence defined as $$V_s=\{v'_1,v'_2,K,v'_i,v'_P\},\quad\text{Equation (7)}$$

where $v'_i=v_i$ if $AP_i \in A_s$, and otherwise 0.

For efficient detection of altered APs, LAAFU can generate only a few random subset samples of the measured RSS vector to see whether the altered AP exists. It should be noted that, if an altered AP exists, it may occur in all of the RSS subset vector samples, which can all result in similar estimated locations and lead to the wrong decision in fast detection. To reduce the false alarm, the RSS subset vectors can be constructed as follows. LAAFU can randomly divide the MAC address vector A into two parts with even sizes and obtain one two-part partition $\{A_1, A_2\}$, such that, $$|A_1|=|A_2|=\tfrac{1}{2}|A|,\quad\text{Equation (8)}$$

where $A_1 \cup A_2 = A$, $A_1 \cap A_2 = \emptyset$. Then based on the $A_1$ and $A_2$ LAAFU can construct two RSS subset vectors from V, respectively, by Equation (7). Similarly, three more RSS subsets can be generated using the three partitions of A. Including the original measured RSS vector, a total of six exclusive samples are provided.

Given the generated RSS subset (vector) samples in the previous step, LAAFU can implement a weighted k-nearest-neighbor (WKNN) algorithm to compute the locations for each of the RSS subset vectors. Let R be the number of RPs in the survey site and j be the index of RP. Denote the 2-D coordinate of $RP_j$ as $l_j=(l_j^1, l_j^2)$. Then the set of RPs can be given by $$L=\{l_1,l_2,K,l_j,K,l_R\}.\quad\text{Equation (9)}$$

Similar to Equation (4), denote the fingerprint at each $RP_j$ as $$F_j=\{v_1^j,v_2^j,K,v_P^j\}.\quad\text{Equation (10)}$$

And the set of fingerprints are given by $$F=\{F_1,F_2,K,F_j,K,F_R\},\quad\text{Equation (11)}$$

Then F and L can be stored into the fingerprint database.

The WKNN can finds the top k nearest RPs whose fingerprints closely match the target measured one. The comparison between RSS vectors $F_j$ and V (or a subset vector $V_s$) can be based on cosine similarity, which can be defined as $$\cos(F_j, V) \triangleq \frac{F_j \cdot V}{|F_j||V|} = \frac{\sum_{p=1}^{P} v_p^j v_p}{\sqrt{\sum_{p=1}^{P} (v_p^j)^2} \sqrt{\sum_{p=1}^{P} (v_p)^2}}.\quad\text{Equation (12)}$$

in locating the target, each of the top k RPs can be assigned with weight, i.e., $$\omega_j=\cos(F_j,V).\quad\text{Equation (13)}$$

WKNN can compute the weighted sum of all the RP coordinates, and the estimated location can be given by $$\hat{l} = \sum_{j}^{k} \frac{\omega_j}{\omega} l_j,\quad\text{Equation (14)}$$

where the normalizing factor ω is $$\omega = \sum_{j}^{k} \omega_j.$$

Given the above six estimated locations, the Euclidean distance can then applied to measure the mutual dispersion between each pair $l_i$ and $l_j$, i.e., $$\|l_i-l_j\|=\sqrt{(l_i-l_j)\cdot(l_i-l_j)^T}.\quad\text{Equation (15)}$$

Next all of the mutual Euclidean distances can be averaged. If the average mutual distance is less than a certain threshold γ (empirically obtained), it can be concluded that the AP alteration may not exist. Here, γ characterizes the sensitivity towards an AP signal change, and is determined by the RSS transient fluctuation and AP alteration. Otherwise, further processing can be described as followings.

Fast detection can randomly permute the APs (A) and construct RSS subsets, each of which costs computational time $\mathcal{O}(|A|)$ and $\mathcal{O}(P)$, respectively ($|A|\leq P$). Therefore, it takes $\mathcal{O}(P)$ in all subset localization, where KNN takes $O(R(P+\log k))$. Therefore, the whole fast detection can take $\mathcal{O}(RP)$.

The localization with altered APs can aim at achieving robust and highly accurate localization in the presence of altered APs. The LAAFU can first randomly generate RSS subset samples, and then estimate their corresponding locations. At this stage, the locations for those subsets without altered APs can form a dense cluster, and disperse otherwise. The LAAFU can subsequently find out the dense cluster, whose centroid can yield the client's location. In this phase, the LAAFU can also identify the altered APs, whose fingerprint values can be adapted in the following update phase.

When altered APs may exist in the measured RSS vector (after the fast detection) a target can be localized. The altered APs, if existent, can be extracted for later fingerprint update.

Recall that locations estimated from those subset RSS samples containing no altered APs tend to form a dense cluster. Therefore, the LAAFU can classify the locations resulting from the subset samples into different clusters, and then distinguish the dense cluster, whose centroid is then the estimated client location. Other dispersed clusters can contain the altered APs.

Because the generation of all of the subset samples given the target RSS vector V can be exponential, a certain number of M subset samples can be generated and randomly drawn from all the possible subsets. For each of the M samples, a user location can be obtained. Given the set of locations, the LAAFU can then cluster the locations.

To generate random subset samples, let A be the list of APs detected by the target. To generate a subset $A_s$ ($1 \leq s \leq M$), a fair coin can be tossed for each $AP_t \in A$, and put $AP_t \in A_s$ if it is heads. For better localization accuracy, $A_s$ can be discarded if $|A_s|$ is too small (e.g., $|A_s| \geq 3$). Given selected APs $A_s \in A$, the LAAFU can generate the corresponding RSS subset vector $V_s$ like Equation (7), for each element in which the RSS value is from an AP. The above subset generation can be repeated until totally M RSS subsets are obtained. They can then be used to estimate locations with WKNN.

Given location dispersion under altered AP(s), the M estimated locations can be clustered in order to accurately find the target location and altered APs. As the dispersion of estimated locations may be high and the number of altered APs is unknown, having a pre-set cluster number for all time is undesirable. Therefore, the affinity propagation clustering can be implemented.

Specifically, the affinity propagation method can take in an M-by-M square matrix of similarities between any two estimated locations as input, where the similarity, denoted as sim(i, j), is given by Euclidean distance between the estimated locations (Equation (15)). During the clustering, two kinds of messages, responsibilities and availabilities are exchanged between the locations:

1. Responsibility res(i, j), sent from location i to j, reflecting how proper j can serves as the centroid for i comparing with other potential centroids.

2. Availability ava(i, j), sent from location j to i, revealing accumulatively how appropriate to choose point j as the centroid for i.

Specifically, the responsibility res(i, j) between location i and j is given by $$res(i, j) \triangleq sim(i, j) - \max_{j' \text{ s.t. } j' \neq j} \{ava(i, j') + sim(i, j')\}, \quad \text{Equation (16)}$$

where the availabilities ava(i, j) are all initialized to zero in the first iteration.

The availability ava(i, j) between location i and j is defined as $$ava(i, j) \triangleq \min\left\{0, res(j, j) + \sum_{i' \text{ s.t. } i' \notin \{i, j\}} \max\{0, res(i', j)\}\right\}, \quad \text{Equation (17)}$$

where $i \neq j$. And the self-availability ava(i, i) is updated differently as $$ava(i, i) \triangleq \sum_{i' \text{ s.t. } i' \neq i} \max\{0, res(i', i)\}. \quad \text{Equation (18)}$$

Therefore, r(i, j)'s and a(i, j)'s are iteratively updated in order to maximize the net similarity, denoted as $\tau_i$, at each location i, i.e., $$\tau_i \triangleq \max_j \{ava(i, j) + res(i, j)\}. \quad \text{Equation (19)}$$

If i=j, i is identified as the centroid of a cluster. Otherwise i can be classified as the cluster whose centroid is j. Such iteration can ends when the clustered points do not change.

Given the clustered locations, the LAAFU can distinguish the dense cluster from other clusters. In the dense cluster, the estimated locations are close to the client's location in signal space. Consequently, their corresponding RSS subsets should have a high similarity with the target RSS vector. The distance between the locations can be measured using cosine similarity in Equation (12).

Specifically, for each cluster C, the LAAFU can select several of the nearest RPs around the centroid of each cluster C using the Euclidean distance (Equation (15)). Then, the average of similarities can be computed between each subset vector $V_i^c$ in C and each $F_j^c$ among the nearest RPs as the similarity of C, i.e., $$\rho_c \triangleq \frac{1}{|C|Q} \sum_i^{|C|} \sum_j^{Q} \cos(V_i^c, F_j^c), \quad \text{Equation (20)}$$

where |C| is the number of location points in cluster C and Q is the number of nearest RPs around the centroid.

The LAAFU can also consider the size of each cluster because small clusters may still lead to high average similarity, and they are likely to deviate from other locations due to presence of altered APs. To address this issue, a Gaussian kernel function can be used to transform the cluster size into a penalty term, ranging from zero to one, i.e., $$v_c \triangleq \exp\left(-\frac{(|C| - |C|_{min})^2}{2b^2}\right), \quad \text{Equation (21)}$$

where the bandwidth parameter b can control the kernel sensitivity and $|C|_{min}$ represent the size of the smallest cluster. Thus, it penalizes more as the cluster size decreases.

Combining above rules, the final score of each cluster c is $$\zeta_c \triangleq \rho_c - v_{c'} \quad (22)$$

The cluster with the highest score can be chosen as the target dense cluster. Its centroid (average of 2-D coordinates) can therefore be returned as the estimated location.

Altered APs are likely to be excluded from RSS subsets within the dense cluster, while the unaltered APs are likely to be distributed evenly inside. To classify the APs, for each $AP_i \in A$ in the selected dense cluster, the LAAFU can count the number of RSS subsets which include AP i, as the frequency of $AP_i$. As the frequency of the altered AP is numerically distant from those of unaltered APs, a two-class clustering problem can be observed in one dimension, which can be solved using Jenks natural breaks optimization method.

The LAAFU can begin the detection by sorting the frequency f's in an increasing order. Next, with each f as a breakpoint, the LAAFU can divide the ordered data into two classes, denoted as $C_1$ and $C_2$, and then calculate the sum of squared deviations from the class means (SDCM) as $$SDCM \triangleq \sum_{i=1}^{2} \sum_{f \in C_i} (f - \bar{f}_i)^2, \quad \text{Equation (23)}$$

where $\bar{f}_i$ is the mean of f's within class $C_i$. The LAAFU can check all possible combinations, which is linear with the number of f's. After the combinations are examined, the break point with the lowest SDCM can be selected, having the smallest frequency variation within the class. Then the LAAFU can mark the APs in the class of lower frequency as altered ones and report them.

To prevent unaltered APs from being mislabeled, long term reports can be reviewed in a sliding window instead of a single alarm. The LAAFU can record the times of APs being identified as altered in the site. Given W location queries from the clients, the LAAFU can calculate the times of each AP, ranging from 0 to W. Through the above one-dimension clustering, the counts can be clustered again into two classes (clusters). Then, the APs in the cluster of more reported times are therefore classified as altered. Note, that if a new AP (not tethered by mobile devices) appears frequently in the long term reports, it can be added into the database to update the affected RPs.

The time complexity can be analyzed by RSS subset sampling, location clustering, dense cluster detection, and altered AP detection. For RSS subset sampling the LAAFU can takes $\mathcal{O}(|A|)$ to toss a coin for each $AP_i \in A$ in subset sampling, and $\mathcal{O}(P)$ for one RSS subset vector. With M RSS subset vectors, the subset sampling can take overall $\mathcal{O}(MP)$, and the WKNN localization cna requires $\mathcal{O}(MRP)$ time (WKNN positioning takes $\mathcal{O}(RP)$ for each subset). The location clustering can utilized an affinity propagation scheme takes $\mathcal{O}(IM^2)$, where I is the number of iterations. Furthermore, the dense cluster detection can takes $\mathcal{O}(M (R \log Q+QP))$ in total. For each cluster c, it can take $\mathcal{O}(R \log Q)$ to find the Q nearest RPs (using a heap with size Q), and $\mathcal{O}(|C|QP)$ in score computation. To summarize, dominated by the RSS subset positioning, the whole online localization under altered APs can take $\mathcal{O}(MRP)$ time. Additionally, altered AP can be detected with at most P APs, sorting costs $\mathcal{O}(P \log P)$ time, where the SDCM calculation is bounded by $\mathcal{O}(P)$ as there are $\mathcal{O}(P)$ potential break points. Overall it can take $\mathcal{O}(P^2)$ to detect altered APs.

The fingerprint database can be updated with the RSSs of the altered APs. By associating the RSSs with the estimated locations anywhere in the area, the LAAFU can use a Gaussian Process Regression (GPR) to adapt its fingerprint according to the current environment. Given the discovered altered APs, their signal values can be updated within a database. The RSS vectors measured by the clients anywhere can capture the signal characteristics in the survey site, especially under crowdsourcing. In order to update the fingerprint signals and respond to environmental changes, this disclosure discusses a method to jointly update the signal map in the survey site, instead of updating the fingerprint points individually. Given the query data (target-measured RSS vectors) and the estimated locations, the signal map can be updated with the altered APs (e.g., updating the signal values at the fingerprint points).

We first introduce the GP regression formulation in Section 6.1. Then we discuss how to estimate the hyperparameters in GP formulation in Section 6.2. After that, we present the verification and final signal update in Section 6.3, followed by complexity analysis in Section 6.4.

The fingerprint update can comprise regressing the signals within the survey site and building up the new fingerprint database. However, due to wall partitioning and signal fluctuation, the signal propagation may have local patterns, such as increased tunneling effect or being dropped after experiencing a concrete wall. Therefore, it is not accurate to simply regress the propagation model which only considers overall path loss.

To address this, a Gaussian process (GP) which preserves the overall path loss characteristics while adapting fingerprints to the local signal distribution can leverage the following equations. If l is the input 2-D location (e.g., regressing the signals floor by floor) and v is the target RSS value, then a standard linear signal regression model of RSS v with an additive Gaussian noise ε, is $$v = f(l) + \varepsilon, \quad \text{Equation (24)}$$

where $f(\cdot)$ is the latent transfer function between the input location and RSS. ε is considered with zero mean and variance $\sigma_n^2$, i.e., $$\varepsilon \sim \mathcal{N}(0, \sigma_n^2). \quad \text{Equation (25)}$$

GP is a statistical distribution, from which any finite number of samples have a joint Gaussian distribution. The transfer function between crowdsourcing location l and its RSS can be specified by a Gaussian process $\mathcal{G}P$ with mean m(l) and covariance k(l, x'), i.e., $$f(l) \sim \mathcal{G}P(m(l), k(l, x')), \quad \text{Equation (26)}$$

where x is a vector of locations surveyed (reference points) in the offline phase. The covariance function k(l, x') can indicate how two RSSs correlate with respect to input locations l and x'. Note that $f(l_i)$ and $f(l_j)$ are unknown while noisy measurements $v_i$ and $v_j$ are given. The covariance between any two input locations can be expressed as $$\text{cov}(v_i, v_j) = k(l_i, l_j) + \sigma_n^2 \delta_{ij}, \quad \text{Equation (27)}$$

where $\delta_{ij} = 1$ if i=j, and 0 otherwise. Let the N-by-2 matrix L be the aggregation of the N input vectors. Then, the covariance over v, the vector of crowdsourced RSSs corresponding to L, is given by $$\text{cov}(v) = K + \sigma_n^2 I, \quad \text{Equation (28)}$$

where K is the N-by-N covariance matrix over all N input vectors and I is the identity matrix of size N. The input RSS values are jointly Gaussian, i.e., $$v \sim \mathcal{N}(m(L), K+\sigma_n^2 I). \quad \text{Equation (29)}$$

Conditioned on training locations L and RSS v collected upon them, the output of the transfer function (RSS prediction) at location $1_\star$, denoted as $f_\star|_{l^\star,L,v}$, is Gaussian distributed, i.e., $$f_\star|_{l^\star,L,v} \sim \mathcal{N}(\mu_\star, \sigma_\star^2), \quad \text{Equation (30)}$$

where the predictive mean RSS is $$\mu_\star = m(l^\star) + k(l^\star, L)^T [K+\sigma_n^2 I]^{-1}(v-m(L)), \quad \text{Equation (31)}$$

and the predictive variance of the RSS is given by $$\sigma_\star^2 = k(l^\star, l^\star) - k(l^\star, L)^T [K+\sigma_n^2 I]^{-1} k(l^\star, L). \quad \text{Equation (32)}$$

The input locations l of clients also contain uncertainty due to location decision error. Such errors can result from the target localization uncertainty. Therefore, beyond Equation (24) the input locations with noise can be considered as, i.e., $$l = \tilde{l} + e_l, \quad \text{Equation (33)}$$

where $\tilde{l}$ is the actual locations and the noise is $$e_l \sim \mathcal{N}(0, \Sigma_l). \quad \text{Equation (34)}$$

The 2-by-2 matrix $\Sigma_l$ is a diagonal matrix assuming each dimension is independent, i.e., $$\Sigma_l[i,i] = \sigma_{l^i}^2, \quad \text{Equation (35)}$$

where $\sigma_{l^i}$ is the uncertainty of input location $l^i$, and all the off-diagonal elements of $\Sigma_l$ are zero. The relationship between RSS signals v and locations $\tilde{l}$ is $$v = f(\tilde{l} + e_l) + \varepsilon. \quad \text{Equation (36)}$$

For ease of calculation, the output RSS can be expanded in Taylor form and approximated using noisy input l, $$v = f(l) + e_l^T \partial f + \varepsilon, \quad \text{Equation (37)}$$

where the 2-dimension vector $$\partial f = \frac{\partial f(l)}{\partial l} \quad \text{Equation (38)}$$

is the derivative of function $f(\bullet)$ with respect to l. Then the output function v can be reformulated as $$v = f(l) + \varepsilon_v, \quad \text{Equation (39)}$$

where $$\varepsilon_v \sim \mathcal{N}(0, \sigma_n^2 + \partial f^T \Sigma_l \partial f). \quad \text{Equation (40)}$$

Therefore, Equation (31) can be rewritten as $$\mu_\star = m(l) + k(l^\star, L)^T [K+\sigma_n^2 I + \text{diag}\{\Delta_f \Sigma_l \Delta_f^T\}]^{-1}(v-m(L)), \quad \text{Equation (41)}$$

where $\Delta_f$ is an N-by-2 matrix of N function values $\partial f$'s (the derivative of $f(\bullet)$ w.r.t N input locations l's), and diag$\{\bullet\}$ denotes the diagonal matrix. Similarly, the RSS variance can be rewritten in Equation (32) as $$\sigma_\star^2 = k(l^\star, l^\star) - k(l^\star, L)^T [K+\sigma_n^2 I + \text{diag}\{\Delta_f \Sigma_l \Delta_f^T\}]^{-1} k(l^\star, L). \quad \text{Equation (42)}$$

In order to find $\mu_\star$ and $\sigma_\star$ in Equations (41) and (42), the mean function $m(l^\star)$ and the covariance $k(\bullet, \bullet)$ can be calculated. Each input location $l_j$ in input matrix L corresponds to an estimated location $\hat{l}_j$ ($1 \leq j \leq N$). And each $v_j$ in v is the RSS at estimated location l from the altered AP. Let $l_{AP}$ be the rough locations of the corresponding AP. For ease of prototyping, a log-distance path loss model can be adopted to calculate $m(l^\star)$ at location ★ as $$m(l^\star) = \alpha + \beta \log_{10}\left(\frac{\|l^\star - l_{AP}\|}{d_0}\right), \quad \text{Equation (43)}$$

where $\alpha$ is the received power (dBm) at reference distance $d_0=1$ m, $\beta$ is the path loss exponent. By default, the LAAFU can discard the input locations if its RSS value $v_{j'}$ is zero. The covariance among input locations is $$k(l_i, l_j) = \sigma_f^2 \exp\left(-\frac{1}{2d^2}(l_i - l_j)^T (l_i - l_j)\right), \quad \text{Equation (44)}$$

where d represents length scale w.r.t the site and $\sigma_f^2$ is RSS variance. Equation (44) represents the sensitivity of signal change between two different locations.

The parameters ($\alpha$, $\beta$, $l_{AP}$, $\sigma_n$, $\sigma_f$, d) above need to be determined prior to the GP prediction being applied. To calculate $\langle \alpha, \beta, l_{AP} \rangle$, ($\alpha$, $\beta$ and $l_{AP}$) can be regressed in the mean function m(l) since it captures the overall characteristics of signals in site. Given the target measured RSSs, the regression is performed to minimize the total RSS error, defined as the sum of the squared difference between mean function values and input target RSSs, i.e., $$E = \sum_i^N (m(l_i) - v_i)^2, \quad \text{Equation (45)}$$

which can be solved using an efficient gradient-descent algorithm like Limited-memory Broyden-Fletcher-Goldfarb-Shannon (BFGS) (Limited memory-BFGS). Specifically, the LAAFU first calculates the partial derivatives of the parameters given by $$\frac{\partial E}{\partial \theta_j} = 2\sum_i^N (m(l_i) - v_i) \frac{\partial m(l_i)}{\partial \theta_j}, \quad \text{Equation (46)}$$

where $q = \langle \alpha, \beta, l_{AP} \rangle$ and the subsequent partial derivatives are $$\frac{\partial m}{\partial \alpha} = 1, \frac{\partial m}{\partial \beta} = \log_{10}(\|l_i - l_{AP}\|), \quad \text{Equation (47)}$$

$$\frac{\partial m}{\partial l_{AP}} = \frac{\beta(l_{AP} - l_i)}{(l_{AP} - l_i)^T (l_{AP} - l_i)}.$$

Then L-BFGS algorithm takes the objective function and partial derivatives as inputs, and returns the parameter results after computation. Through $l_{AP}$ in hyperparameter estimation, the location of the altered AP can be reestimate due to movement.

Given the mean function, $\langle \sigma_n, \sigma_f, d \rangle$ can be calculated by formulating the log likelihood of v as $$\log p(v|L, q) = -\frac{1}{2} z^T K_v^{-1} z - \frac{1}{2} \log |K_v| - \frac{n}{2} \log 2\pi, \quad \text{Equation (48)}$$

where $q=\langle\sigma_n, \sigma_f, d\rangle$ are the hyperparameters to be estimated, and the covariance between signals are $$K_v = K + \sigma_n^2 I, \quad \text{Equation (49)}$$

and the difference between measured RSSs and mean function is $$z = v - m(L). \quad \text{Equation (50)}$$

The L-BFGS algorithm can be used to solve the optimization problem with the partial derivatives of the log likelihood as $$\frac{\partial}{\partial \theta_j} \log p(v \mid L, q) = \frac{1}{2} z^T K_v^{-1T} \frac{\partial K_v}{\partial \theta_j} K_v^{-1} z - \frac{1}{2} tr\left(K_y^{-1} \frac{\partial K_v}{\partial \theta_j}\right) = \quad \text{Equation (51)}$$

$$\frac{1}{2} tr\left[((K_v^{-1} z)(K_v^{-1} z)^T - K_v^{-1}) \frac{\partial K_v}{\partial \theta_j}\right].$$

Let squared Euclidean distance between location i and j be $t_{ij} = (l_i - l_j)^T (l_i - l_j)$. Then the LAAFU can compute the partial derivative for each hyperparameter as $$\frac{\partial K_v[i, j]}{\partial \sigma_n} = 2\sigma_n \delta_{ij}, \quad \text{Equation (52)}$$

$$\frac{\partial K_v[i, j]}{\partial \sigma_f} = 2\sigma_f \exp\left(-\frac{t_{ij}}{2l^2}\right),$$

$$\frac{\partial K_v[i, j]}{\partial d} = \frac{t_{ij} \sigma_f^2}{d^3} \exp\left(-\frac{t_{ij}}{2d^2}\right),$$

where $\sigma_{ij}=1$ if i=j, and otherwise 0.

Note that Equation (41) contains $\Delta_f$ which represents the derivative of $f(\cdot)$ with respect to input locations. Its existence makes the direct solution of $\langle\sigma_n, \sigma_f, d\rangle$ by the above L-BFGS algorithm difficult.

To determine hyperparameter estimation with location errors a two-step iteration can be implemented to estimate the above hyperparameters. First, given training data L and v, the LAAFU can estimate the hyperparameters of a standard Gaussian process model via Equations (31) and (32) with no input noise. Second, it can compute $\Delta_f$ at each of the input locations as $$\partial_f = \frac{\partial m}{\partial l} + \frac{\partial k(l, L)^T}{\partial l} K^{-1}(v - m(L)). \quad \text{Equation (53)}$$

Then the LAAFU can update the covariance matrix as $$K_v = K + \sigma_n^2 I + \text{diag}\{\Delta_f \Sigma_l \Delta_f^T\}, \quad \text{Equation (54)}$$

which has input noise variance. And then the LAAFU can estimate all hyperparameters by again maximizing the log likelihood using Equation (51). The partial derivative of $\sigma_{l_j}$ is therefore given by $$\frac{\partial K_v[i, i]}{\partial \sigma_{1,j}} = 2(\Delta_f[i, j])^2 \sigma_{1,j}, \quad \text{Equation (55)}$$

while all the other off-diagonal entries in $K_v$ are zero. The LAAFU can repeat these two steps until the hyperparameters converge.

The LAAFU can randomly select N data from the W samples where (N<W) for GP training, and the remaining N are used verify accuracy of regression (prediction). The LAAFU can repeat the above for several iterations and choose the best fit to a signal map to prevent overfitting.

For each altered AP p, the LAAFU can take in N samples as input to calculate the hyperparameters of GP. Via this preliminary model, the LAAFU can predict the signal value $\mu_{pt}$ at each $l_t$ of the remaining locations ($1 \le t \le W-N$). Then the LAAFU can compare $\mu_{pt}$ with ground truth value $v_{pt}$ of that location $l_t$ and find the total RSS error for the altered AP p as $$e_p \triangleq \sum_{t}^{W-N} |\mu_{pt} - v_{pt}|. \quad \text{Equation (56)}$$

The LAAFU can repeat above process several times and find the GP models with the smallest total RSS error. Given the selected GP model, for each altered AP p, a regression model can be first generated. Then at each RP j the LAAFU can calculate the predicted signal mean $\mu_{pj}$ and RSS standard deviation $\sigma_{pj}$.

When there is a significant signal change the fingerprint of the AP can be updated to reduce the influence of some temporal fluctuations. For AP p, the mean of its RSS standard deviation, denoted as $\sigma_p$, can be calculated at all RPs in the site. The constructed standard deviation for AP p can be defined as $$\sigma_{pj}' = \sqrt{\sigma_{pj}^2 + \sigma_p^2}. \quad \text{Equation (57)}$$

If the absolute difference, $|\mu_{pj} - v_{pj}|$, between the two RSS values $\mu_{pj}$ and $v_{pj}$ is larger than the product of a factor $\kappa$ and constructed standard deviation, i.e., $$|\mu_{ij} - v_{ij}| \ge \kappa \cdot \sigma_{ij}', \quad \text{Equation (58)}$$

then the LAAFU can conclude that there is a significant signal change of the AP p at RP j, rather than just temporal signal fluctuation. Finally, an autoregressive moving average (ARMA) model can be applied with a weight value $\lambda$ ($0 \le \lambda \le 1$) to update the fingerprint into $v_{pj}'$, i.e., $$v_{pj}' = (1-\lambda) \cdot v_{pj} + \lambda \cdot \mu_{pj}. \quad \text{Equation (59)}$$

Given N samples for model training, the computation, including objective function and the partial derivatives, is $O(N)$ in calculating all $\mu_*$'s at affected RPs. Each iteration of GP regression is dominated by the inversion of the covariance matrix, which takes $O(N^3)$. Therefore, the model training complexity sums up to $O(N^3)$.

Given the trained GP model, it takes $O(N)$ time to predict an RSS and update the fingerprint at one RP, which takes totally $O(RN)$ at all RPs for each altered AP. It should be understood that the fingerprint update can be conducted in a separate server and the localization performance will not be affected.

In one embodiment, described herein is a method comprising identifying, by a wireless network device comprising a processor, a first location associated with an access point device of access point devices. In response to identifying a second location associated with the access point device and different than the first location, the method can determine, by the wireless network device, that the access point device has become an altered access point device. Additionally, the method can comprise associating, by the wireless network device, a reference location with the altered access point device. The method can comprise filtering, by the wireless network device, the altered access point device from the access point devices; and in response to the filtering, the method can update, by the wireless network device, the reference location associated with the altered access point device.

According to another embodiment, a system can facilitate, identifying a first power associated with an access point device of access point devices, and in response to identifying a second power associated with the access point device and different than the first power, the system can determine that the access point device has become an altered access point device. The system can comprise estimating a likelihood of an altered access point signal associated with the altered access point device, and the system can comprise grouping received signal strengths associated with the access point devices, resulting in grouped signal strengths. Based on the grouped signal strengths, the system can estimate corresponding locations associated with the access point devices, resulting in estimated corresponding locations. In in response to determining a first location of a mobile device, the system can identify a second location associated with the altered access point device. Consequently, the system can update a data store with a received signal strength associated with the altered access point device relative to the first location of the mobile device.

According to yet another embodiment, described herein is a machine-readable storage medium that can perform the operations comprising identifying a first power associated with an access point device of access point devices. In response to identifying a second power associated with the access point device that is different than the first power, the machine-readable medium can determine that the access point device has become an altered access point device. Furthermore, the machine-readable medium can measure received signal strengths from access point devices. Based on the received signal strengths, the machine-readable medium can comprise grouping the access point devices, resulting in grouped access point devices. Thus, the machine-readable medium can estimate a location of the altered access point device resulting in an estimated location, in response to the grouping of the access point devices, These and other embodiments or implementations are described in more detail below with reference to the drawings.

Referring now to FIG. 1, illustrated is an example wireless network comprising a localization with altered access points and fingerprint updating according to one or more embodiments. The LAAFU system 100 can use a detection algorithm to estimate whether there are altered AP 106 signals or not in the RSS vector as measured by a client. If not, location can be estimated as usual. For instance, the AP 106 signals can change over time due to unexpected AP 106 movement, power adjustments, introduction or removal of wall partitioning, wearing, etc. A mobile device 102 on the client side can wirelessly communicate with the APs 106. Additionally, both the mobile device 102 and the APs 106 can both communicate with a base station device 104. Thus, AP 106 signal data associated with the APs can be stored in a fingerprint database 108. The LAAFU system 100 can generate RSS subset samples, and then estimates the corresponding locations of the APs 106. Therefore, comparing the generated RSS subset samples to previous signal data can allow the LAAFU system 100 to identify altered APs 106. Thus, the fingerprint database 108 can be updated with identification data related to the APs 106 that have been altered.

Figure 2:
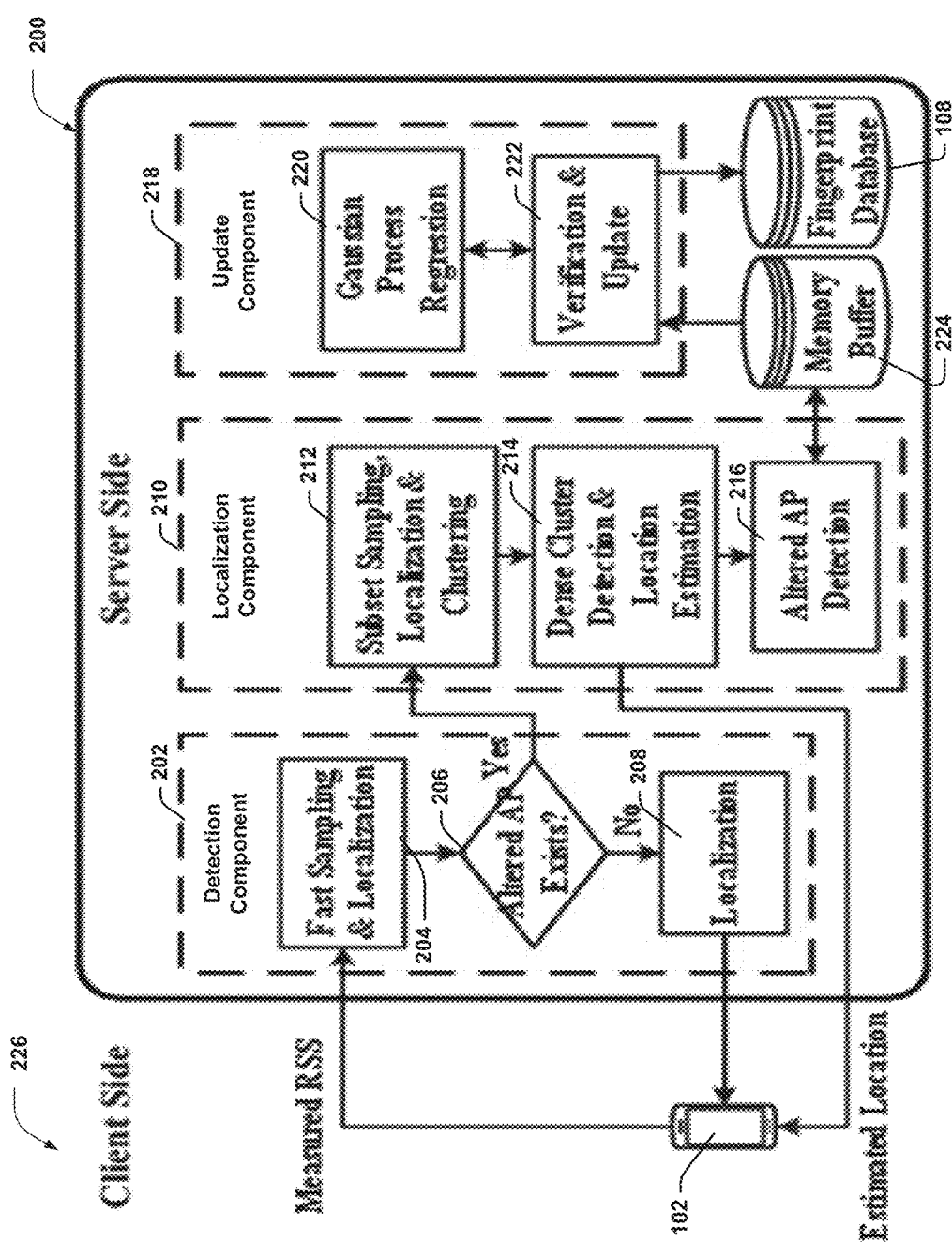
FIG. 2 illustrates an example schematic system block diagram of a localization with altered access points and fingerprint updating according to one or more embodiments.

Referring now to FIG. 2, illustrated is an example schematic system block diagram of a localization with altered access points and fingerprint updating according to one or more embodiments. The LAAFU system 100 can use has a fast detection algorithm to estimate whether there is altered AP 106 signal or not in a RSS vector as measured by a client 226. A detection component 202 can identify the existence of altered APs 106 by performing a fast sampling and localization at block 204. The fast sampling and localization at block 204 can partition the RSS vector into multiple subsets and check the dispersiveness of these estimations. For instance, the mobile device 102 on the client 226 side, can receive a signal strength associated with AP 106 devices. If there is not detection of an altered AP 106 device at block 206, then the LAAFU system 100 proceed to localization at block 208 where it can estimate the locations of the AP 106 devices as usual. However, if there is a detection altered APs 106 at block 206, then the LAAFU system 100 can begin the the next phase, which can be localization of the altered APs 106, by the localization component 210, to locate the client. The fast detection by the detection component 202 can reduce unnecessary computation and increase the speed of the LAAFU system 100.

To achieve localization of the altered APs 106, the LAAFU system 100 first randomly generate RSS subset samples at block and then estimates their corresponding locations at block 212. The LAAFU system 100 can employ a weighting technique to identify dense clusters based on signal similarity and cluster size. At this stage, the locations for those subsets without altered APs 106 form a dense cluster, and disperse otherwise. The LAAFU system 100 can subsequently determine dense clusters, whose centroid yields the client's location, at block 214. Next, at block 216, the LAAFU system 100 can identify the altered APs 106, whose fingerprint values can be updated by an update component 218.

The update component 218 can update a fingerprint database with the RSSs of the altered APs 106 by first, storing the RSSs of the altered APs 106 in a memory buffer 224. The memory buffer 224 can then pass this info along to block 222 for a verification and update process by which the update component 218 associates the RSSs with the estimated locations anywhere in the area. The update component can then use a Gaussian Process Regression (GPR) at block 220 to adapt the fingerprints according to the current environment and update a fingerprint database 108.

Figure 3:
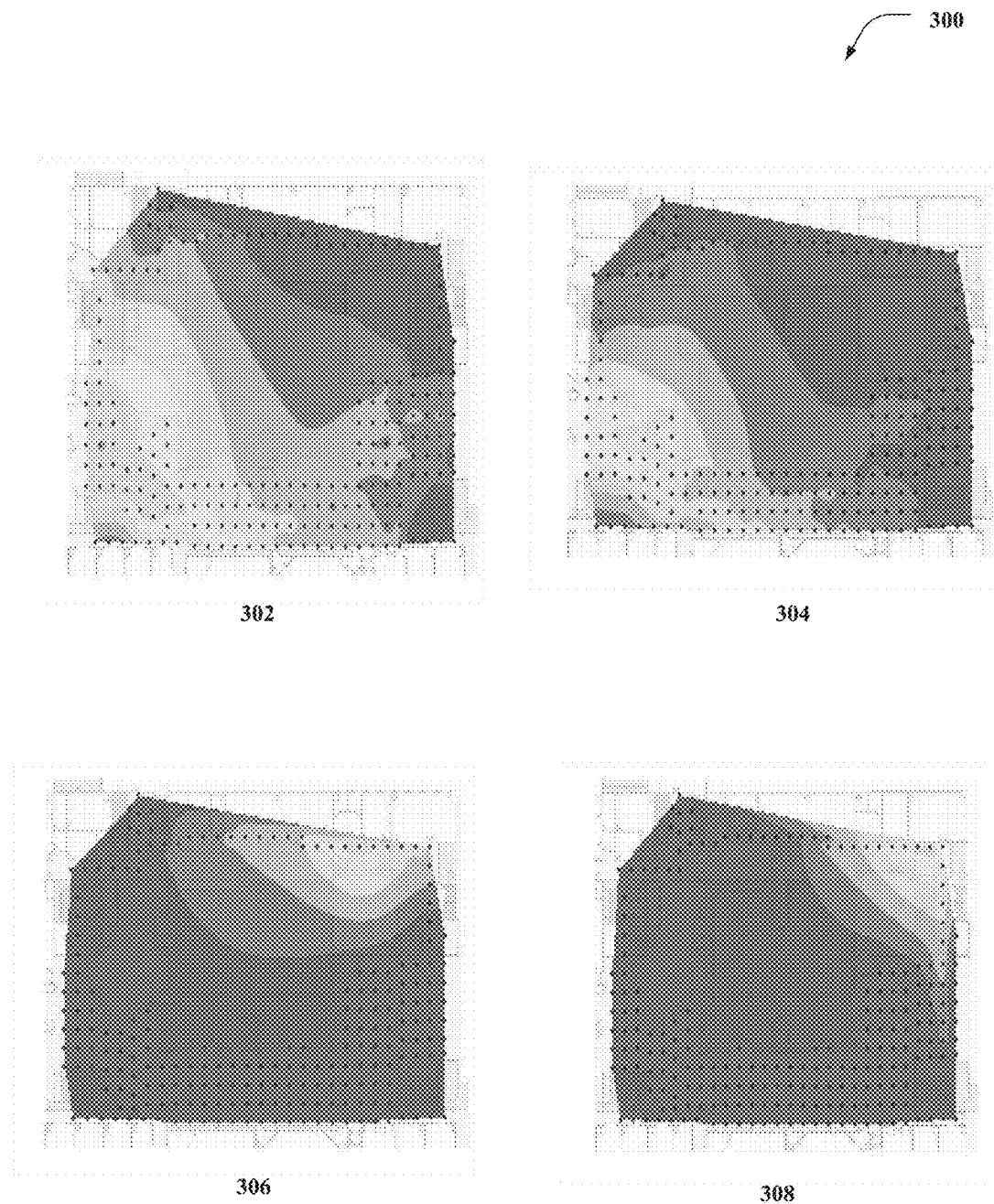
FIG. 3 illustrates example heat maps of access points according to one or more embodiments.

Referring now to FIG. 3, illustrated are example heat maps of access points according to one or more embodiments. The graphs 300 comprise an original heat map 302, as opposed to a heat map due to a transmission power reduction 304. The graphs 300 also comprise another original heat map 306 as opposed to a heat map due to AP movement 308. The AP alteration can lead to the dispersion in the locations estimated from the RSS subsets.

Figure 4:
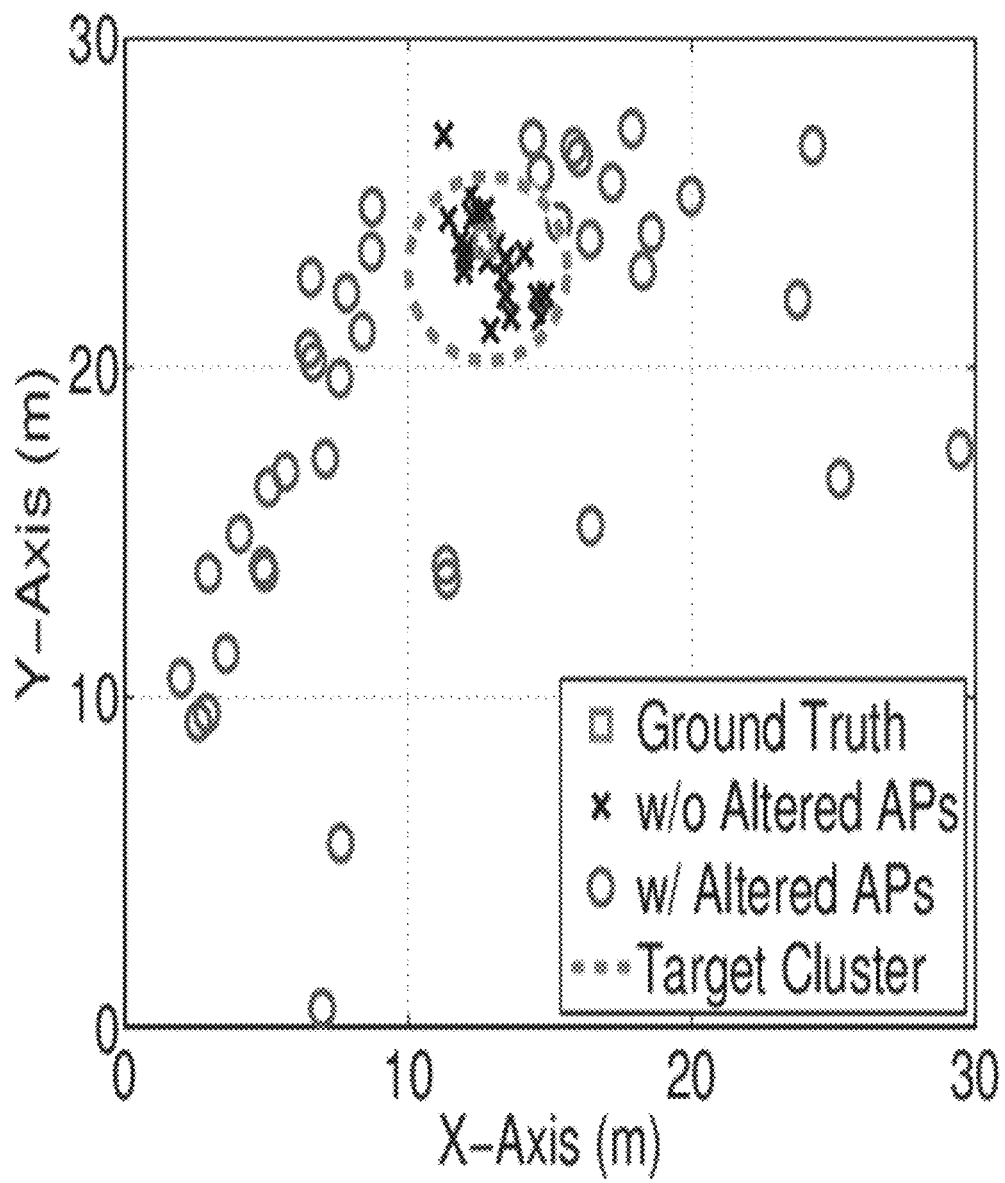
FIG. 4 illustrates an example graph of received signal strength locations of access points according to one or more embodiments.

Referring now to FIG. 4, illustrated is an example graph of received signal strength locations of access points according to one or more embodiments. FIG. 4 shows the estimated locations for generated subsets. The RSS subsets without any altered APs tend to cluster together around the ground truth location. On the other hand, locations estimated from the subsets comprising the altered APs tend to be dispersed in nature. Thus, the client location can be identified by locating the dense cluster. Furthermore, given the client location, the fingerprint database can then be updated with the received RSS vectors.

Figure 5:
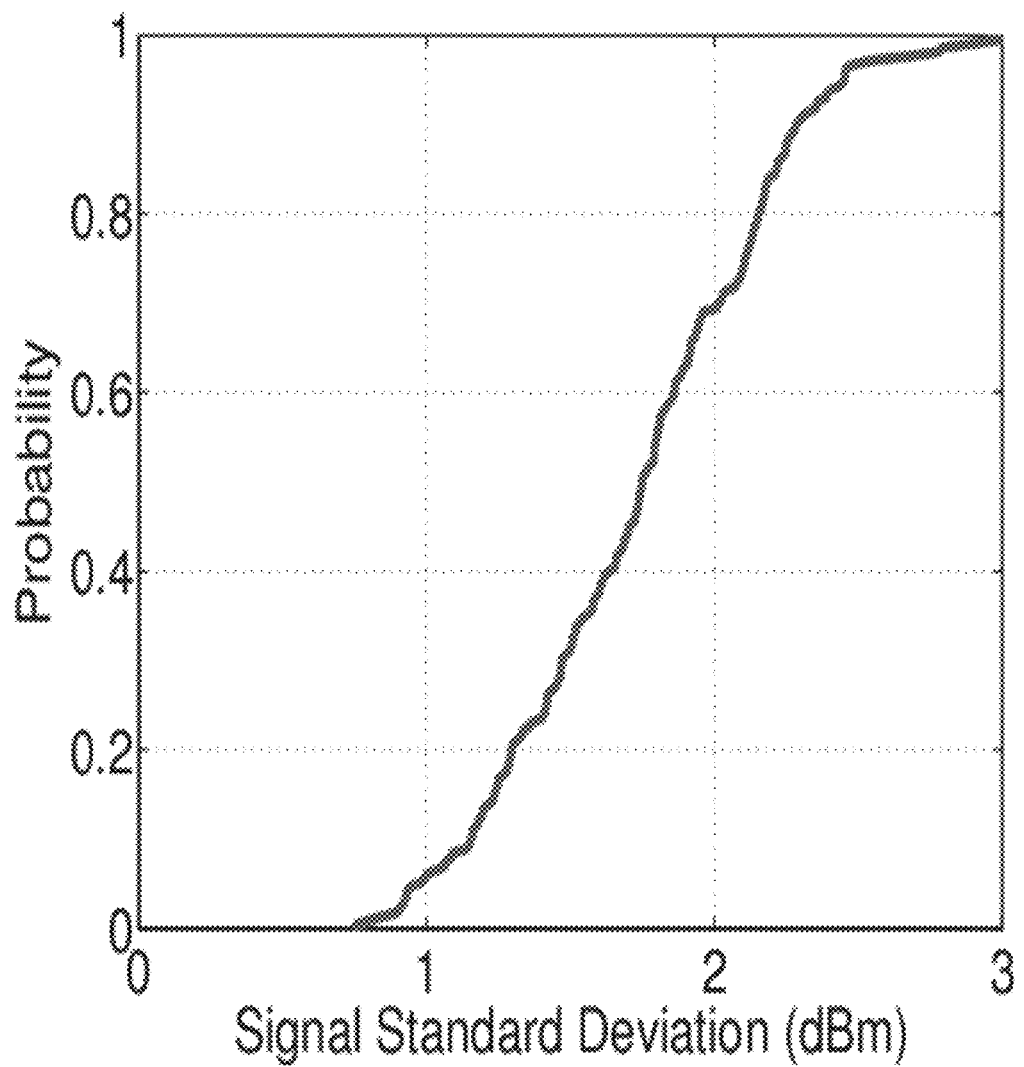
FIG. 5 illustrates an example graph of the standard deviation of the received signal strengths according to one or more embodiments.

Referring now to FIG. 5, illustrated is an example graph of the standard deviation of the received signal strengths according to one or more embodiments. Based on an experimental setup a building (5,400 m$^2$) with overall 210 RPs are sampled in 3 m grid size. At each RP, 60 RSS vectors can be collected to calculate the mean and variance of RSSs. FIG. 5 depicts the cumulative distribution of average RSS standard deviation in all RPs. As shown, most RSS noise is within 2.5 dB.

Figure 6:
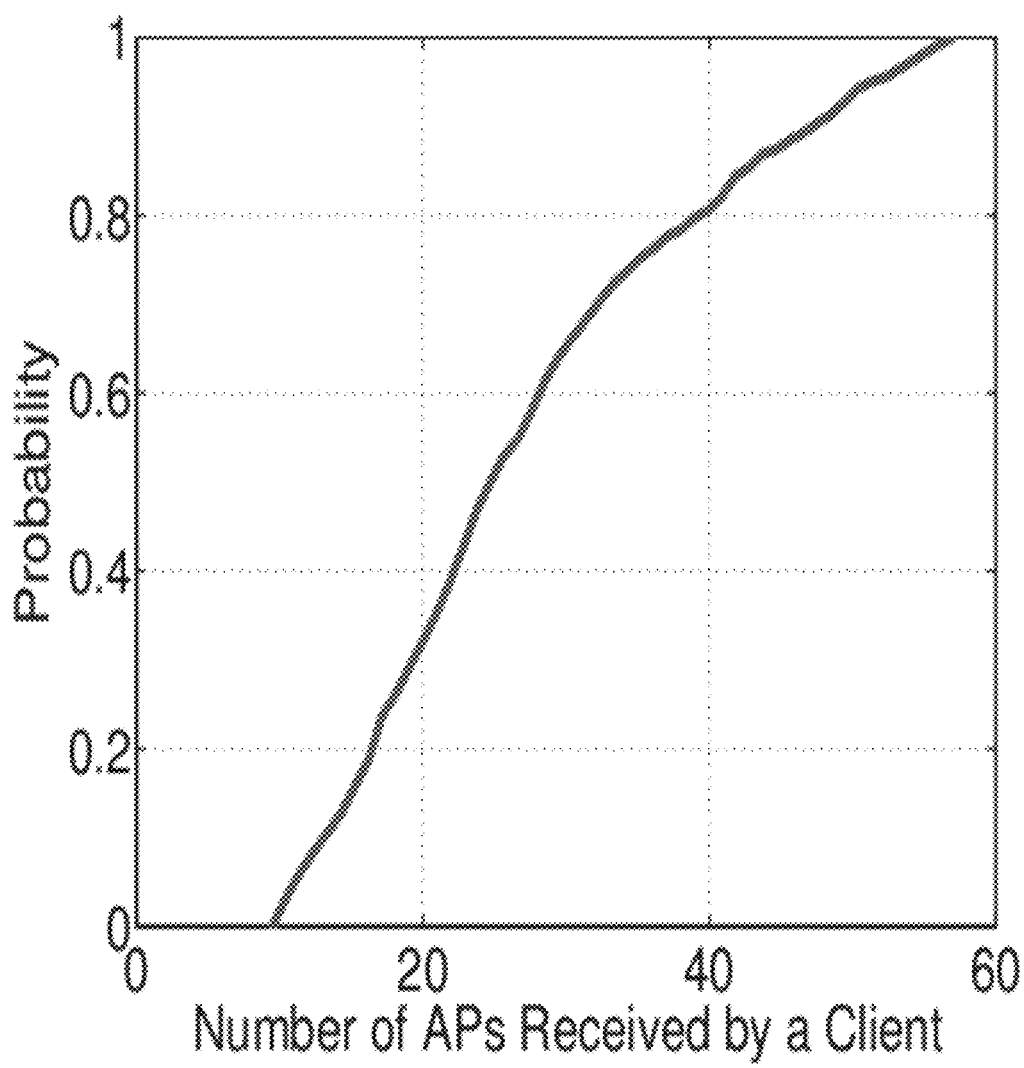
FIG. 6 illustrates an example graph of the number of access points received by a client according to one or more embodiments.

Referring now to FIG. 6, illustrated is an example graph of the number of access points received by a client according to one or more embodiments. For online testing during an experimental setup, target signals can be collected from 900 random locations. 156 total APs are detected after filtering out the APs with little coverage or tethered by mobile devices. With no knowledge of AP locations before site survey FIG. 6 illustrates the AP frequency cumulative distribution function (CDF) at all target vectors. On average 27 APs can be detected at each target.

The following baseline parameters can be used to attain these results: k=5 for WKNN, distance threshold $\gamma$=6 m, for fast detection. Randomly select 2 APs to alter their transmission power, the signal change factor in AP alteration is 15 dB, Q=5 nearest RPs can used in cluster similarity calculation. Bandwidth b=5 in Equation (21). Sliding window of location query accumulation W=200. In GP regression, N=100 fingerprints can be used for GP model training. 20 times of fingerprint verification can be conducted. K=2 for RSS update decision in Equation (58) and $\lambda$=0.5 for ARMA update in Equation (59).

Figure 7:
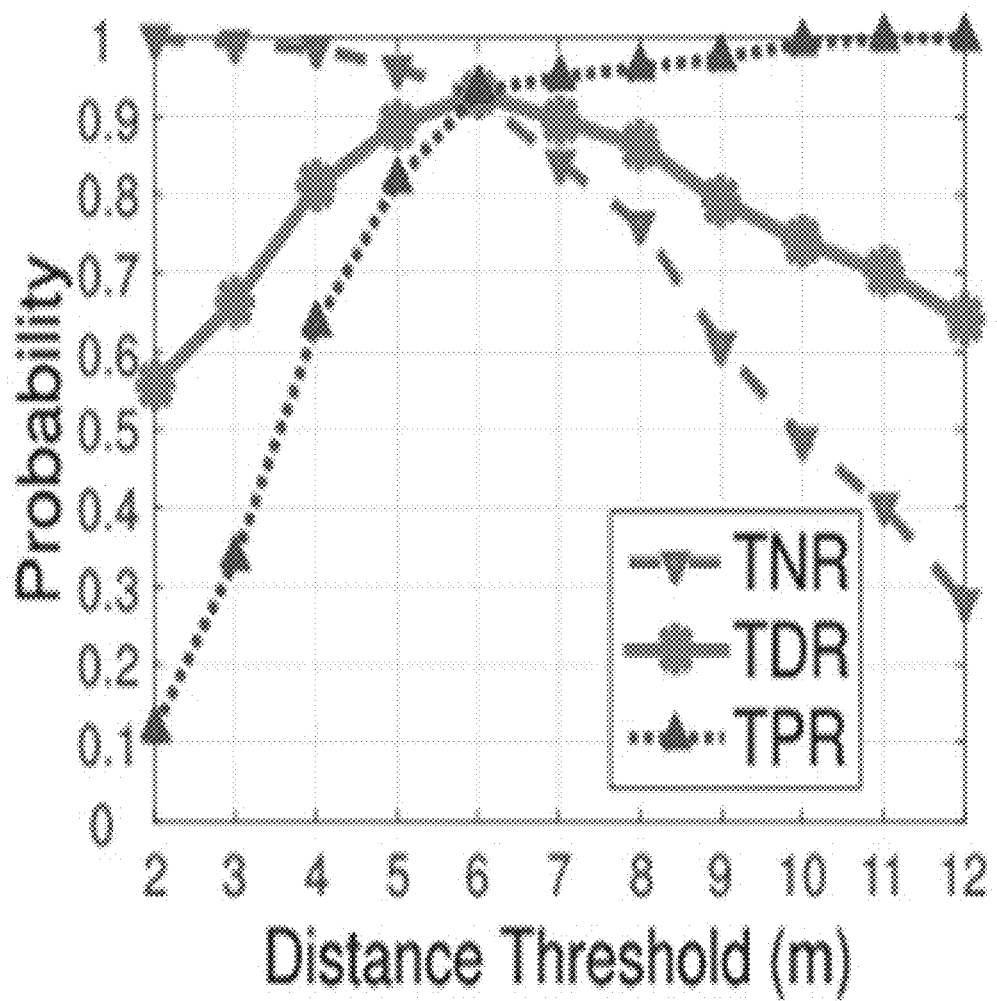
FIG. 7 illustrates an example graph of a distance threshold according to one or more embodiments.

Referring now to FIG. 7, illustrated is an example graph of a distance threshold according to one or more embodiments. FIG. 7 illustrates TNR, ACC and TPR versus the distance threshold $\gamma$ in fast detection. When $\gamma$ is small, fast detection can be sensitive and almost all the targets are classified as positive. TPR is low and TNR is high due to many unaltered cases where only temporal fluctuation are classified as altered. When $\gamma$ is increased, fast detection becomes adaptive and correctly classifies unaltered test cases. Therefore, TPR increases. However, if $\gamma$ further increases, the detection criterion is insensitive to altered cases, thus, TNR becomes low. To achieve a balance, $\gamma$=6 where ACC, TPR and TNR are all optimal. $\gamma$ can be also empirically set according to positioning error of unaltered targets.

Figure 8:
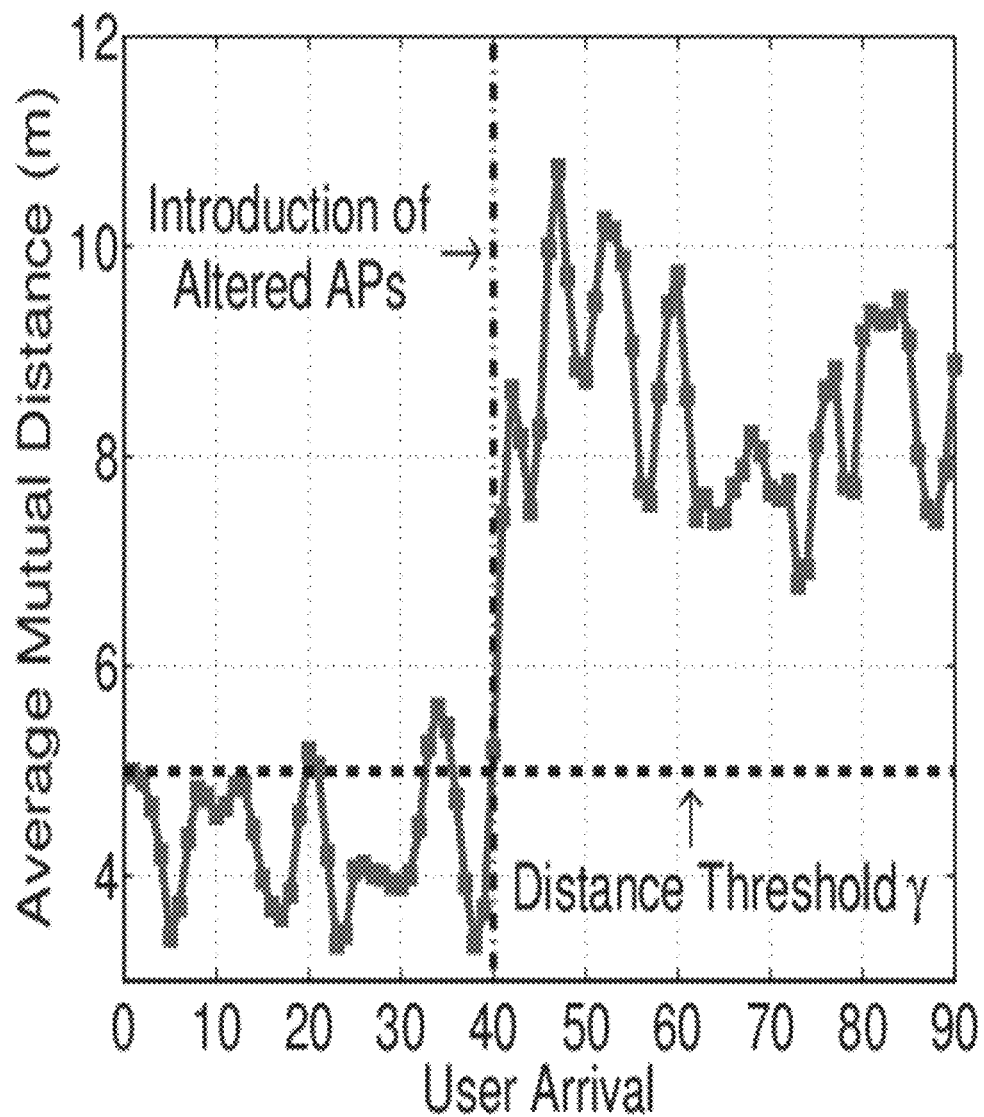
FIG. 8 illustrates an example graph of an average mutual distance before and after access point alteration according to one or more embodiments.

Referring now to FIG. 8, illustrated is an example graph of an average mutual distance before and after access point alteration according to one or more embodiments. When $\gamma$=6 m, the average mutual distance versus temporal user arrivals can be illustrated. Before the introduction of altered APs, the average mutual distance is small, and correct classification can be observe as negative cases (unaltered). After introduction of altered APs, the mutual distance rises sharply above the threshold, as altered APs lead to dispersed estimated locations. Using such a scheme, fast detection can accurately and efficiently detect the existence of altered AP(s).

Figure 9:
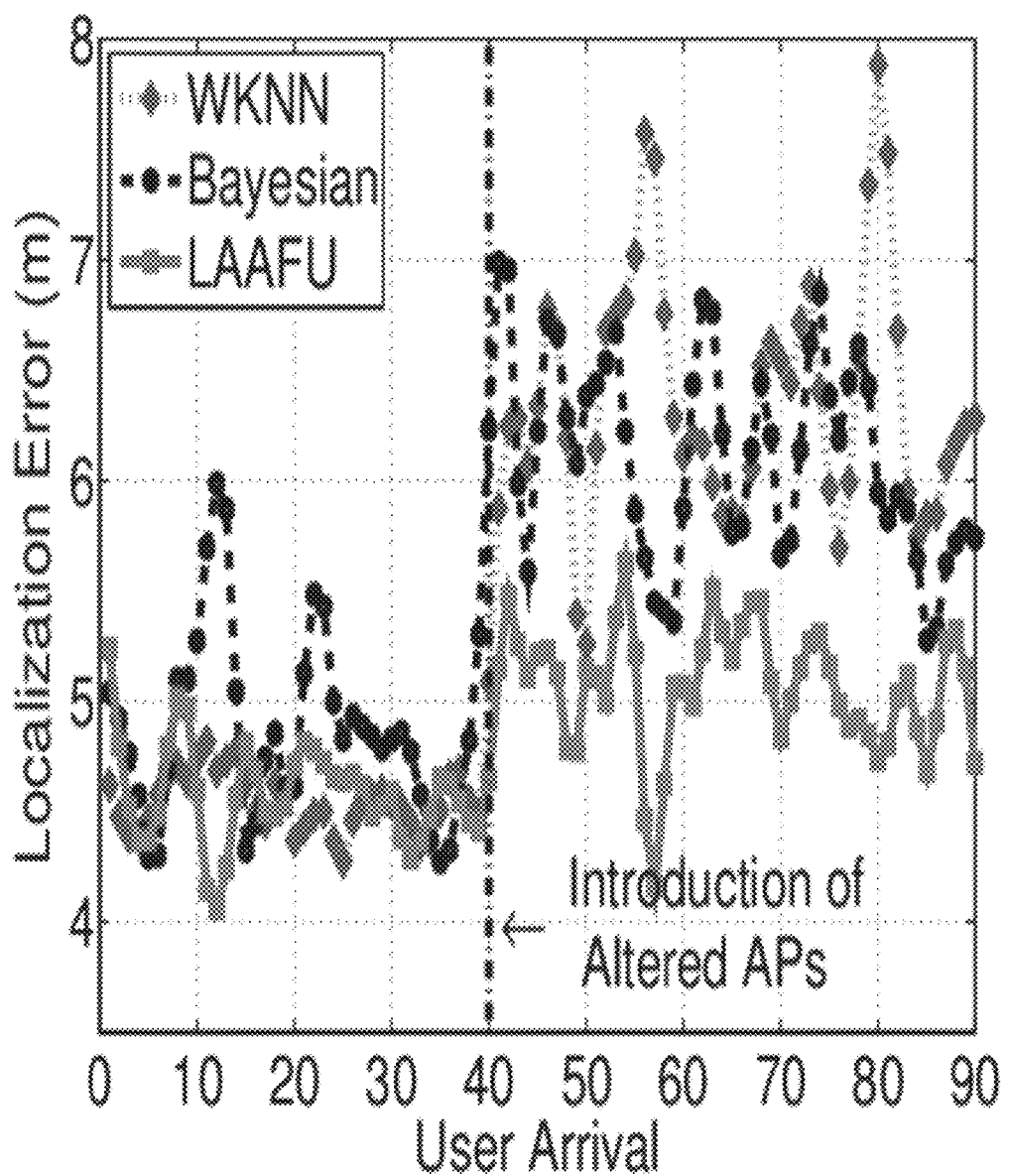
FIG. 9 illustrates an example graph of a mean localization error before and after AP alteration according to one or more embodiments.

Referring now to FIG. 9, illustrated is an example graph of a mean localization error before and after AP alteration according to one or more embodiments. FIG. 9 depicts the temporal localization errors versus the time series of location queries, which are the temporal arrivals of users. Before introduction of altered APs, three algorithms can have similar localization errors. Given altered APs, WKNN and Bayesian algorithms have high errors because they do not consider AP alteration. Dispersion happens in their location estimations. However, different from these techniques, the LAAFU system 100 can successfully filter out the altered APs 106 from the RSS vectors and maintain the higher localization accuracy.

Figure 10:
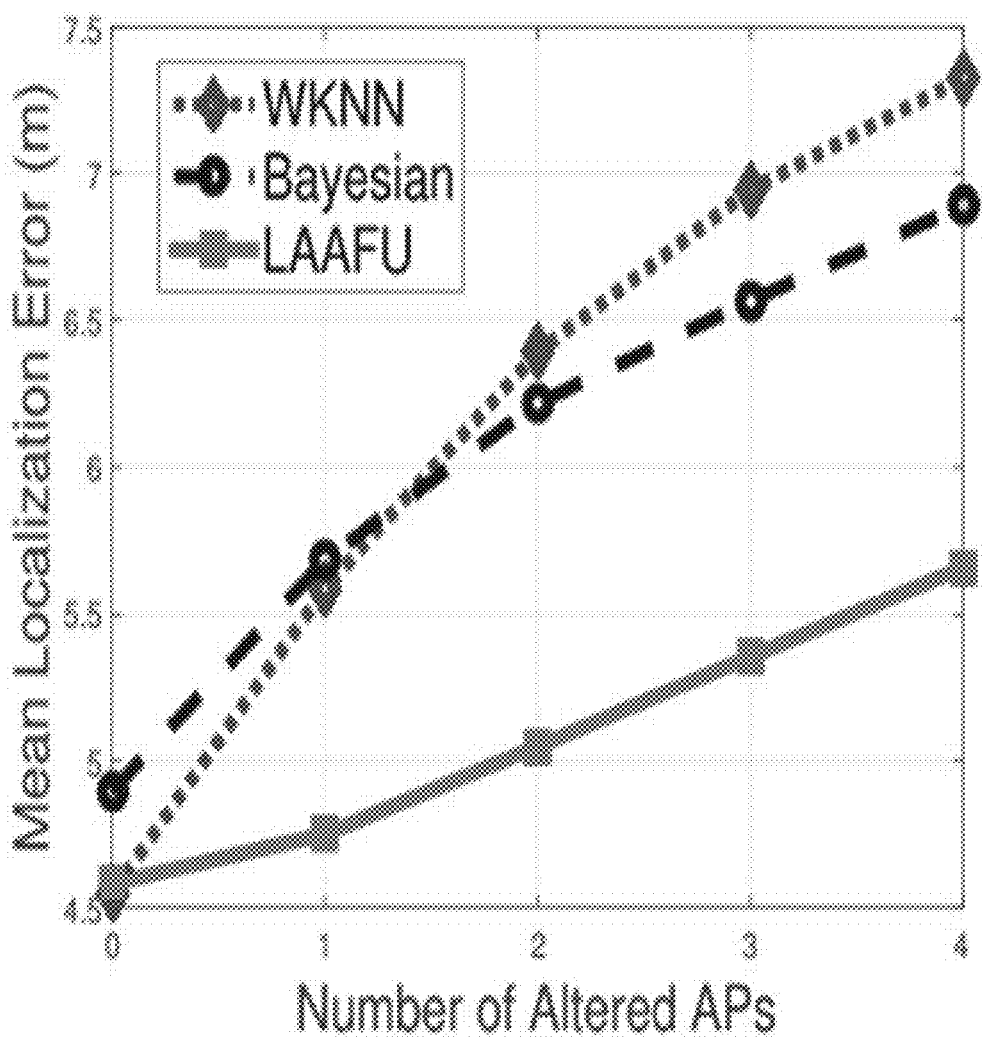
FIG. 10 illustrates an example graph of mean localization error versus number of altered APs according to one or more embodiments.

Referring now to FIG. 10, illustrated is an example graph of mean localization error versus number of altered APs according to one or more embodiments. FIG. 10 depicts the mean localization errors versus the number of altered APs introduced. Both WKNN and Bayesian algorithms can degrade in accuracy because of dispersion in estimations. To the contrary, the LAAFU system 100 can successfully filter the altered APs 106 and maintain high localization accuracy. The LAAFU system 100 not only considers the average signal similarity of each cluster, but also leverages their size in finding the dense ones. Hence, the LAAFU system 100 does not bias to small clusters, and achieves better localization accuracy.

Figure 11:
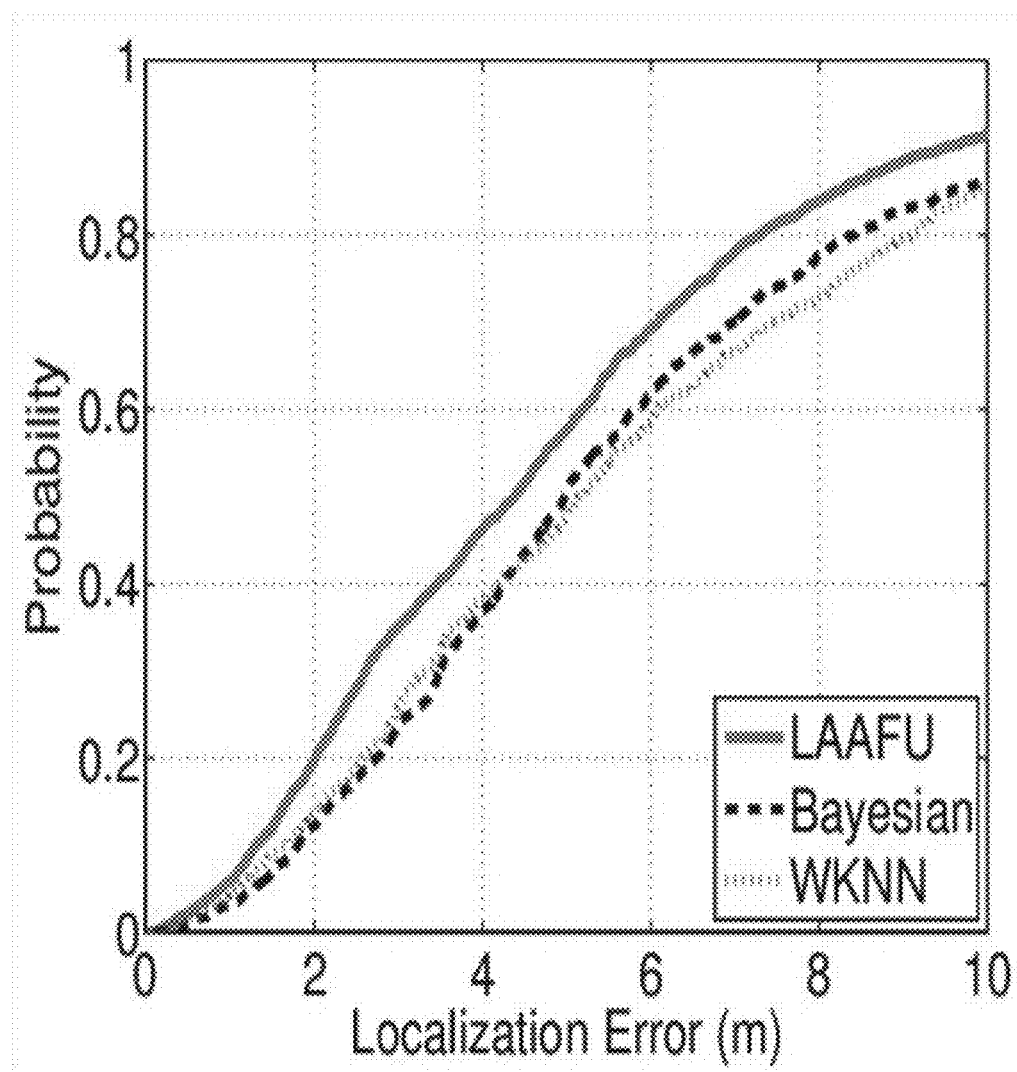
FIG. 11 illustrates an example graph of cumulative probability of location errors in the presence of altered APs according to one or more embodiments.

Referring now to FIG. 11, illustrated are example heat maps of access points according to one or more embodiments. FIG. 11 shows the localization error CDFs of three different schemes in the presence of altered APs 106. Both the WKNN and Bayesian algorithms can achieve higher errors without filtering the altered APs 106. By RSS subset clustering, the LAAFU system 100 can reduce the influence of altered APs 106 and achieve better positioning accuracy.

Figure 12:
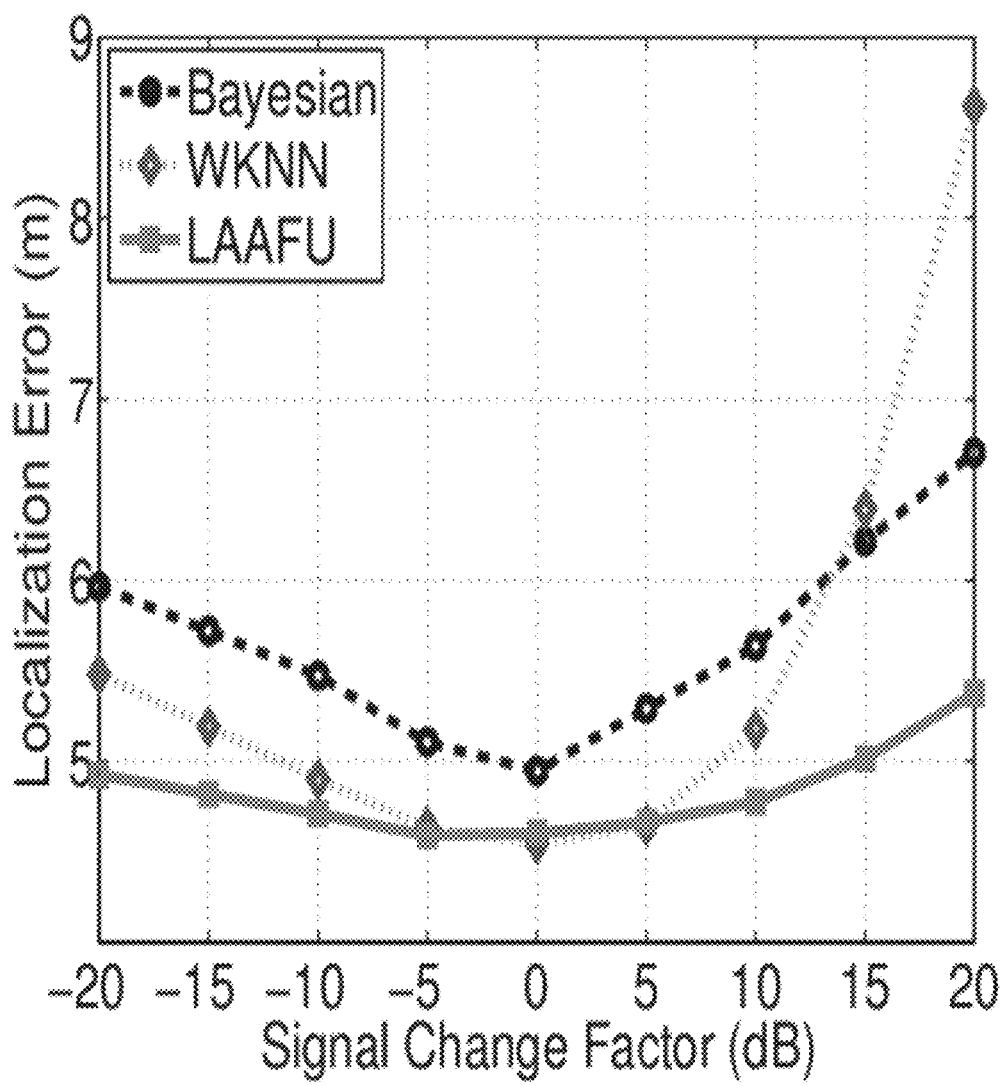
FIG. 12 illustrates an example graph of mean localization error versus signal change factor according to one or more embodiments.

Referring now to FIG. 12, illustrated is an example graph of mean localization error versus signal change factor according to one or more embodiments. FIG. 12 depicts the mean localization errors versus the signal change factor (from −20 dB to 20 dB). When the APs 106 signals are not altered, the LAAFU system 100 has the same localization error as WKNN, because after identifying the APs 106 as unaltered, the LAAFU system 100 can run the same WKNN positioning. Given altered APs 106, WKNN and Bayesian methods suffer from the dispersion of location estimations. When the factor changes from 0 to −20 dB, the increase of localization error is smaller compared with reverse direction. It is because under transmission power reduction, coverage of altered APs 106 shrink and fewer query data detect this AP 106.

Figure 13:
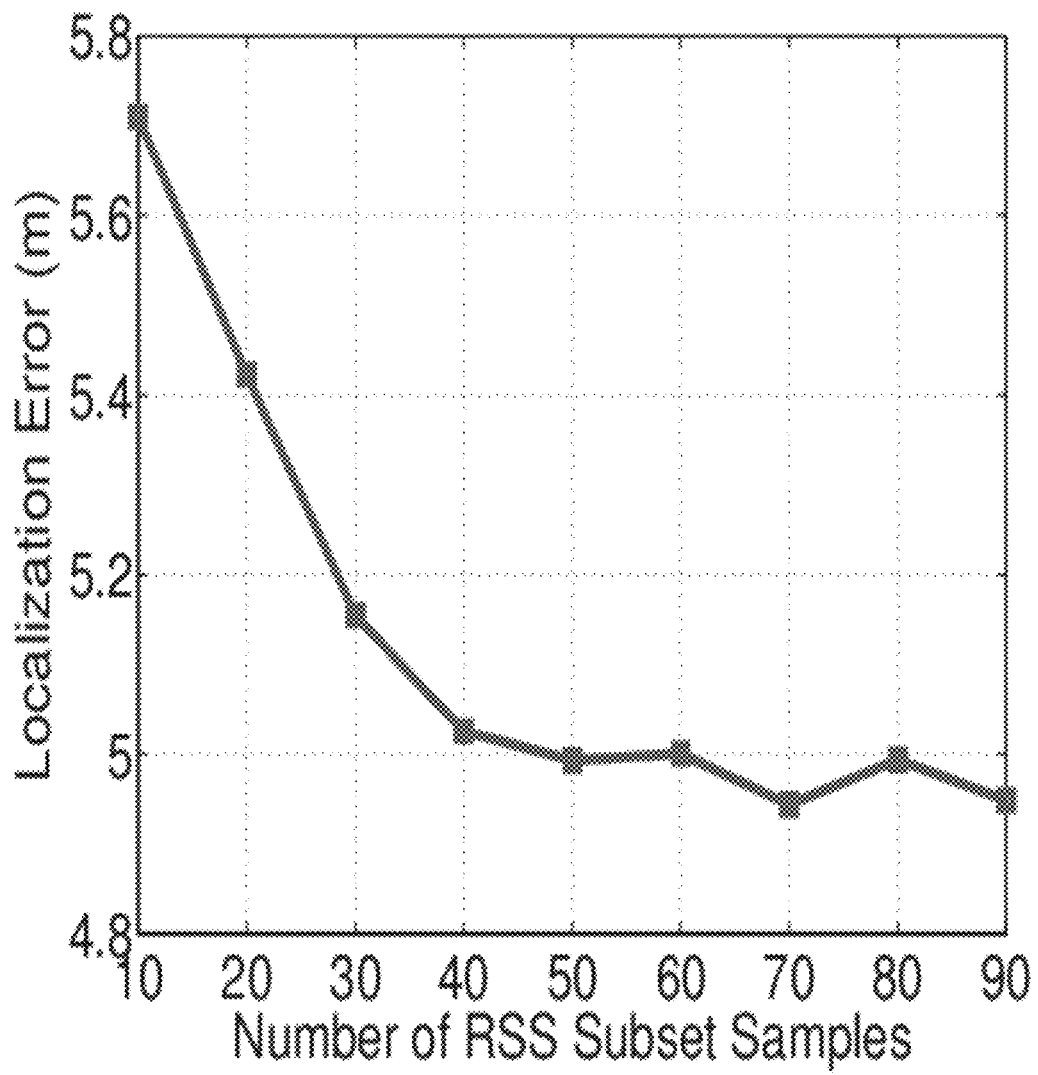
FIG. 13 illustrates an example graph of localization error versus number of RSS subset samples generated according to one or more embodiments.

Referring now to FIG. 13, illustrated is an example graph of localization error versus number of RSS subset samples generated according to one or more embodiments. FIG. 13 depicts the localization error versus the number of generated subset samples. The more RSS subsets the LAAFU system 100 generates, the higher localization accuracy it can achieve. The more RSS subsets have more location estimations, the more information can be provided in distinguishing a dense cluster. As the number further increases, improvement converges as the existing subsets are already sufficient for accurate dense cluster identification and final localization.

Figure 14:
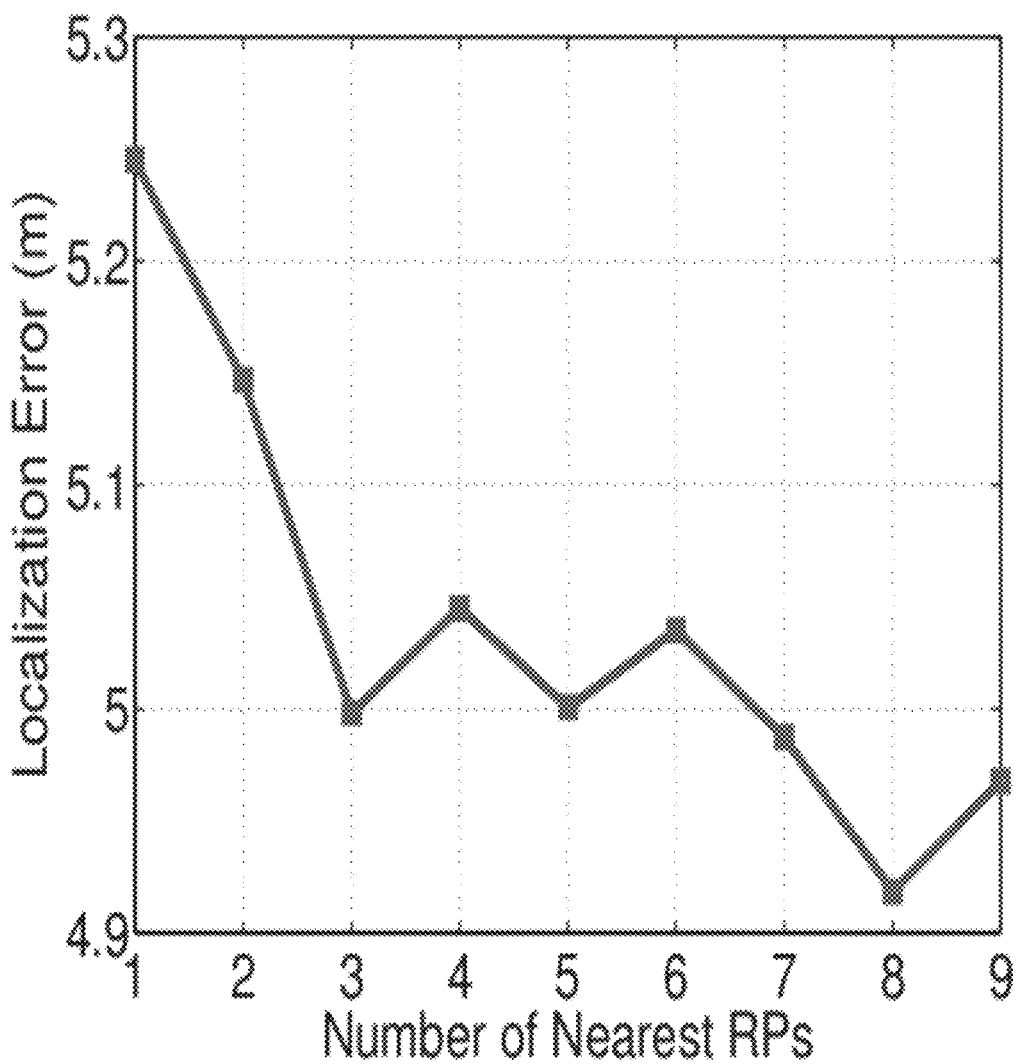
FIG. 14 illustrates an example graph of localization error versus number of nearest RPs set in cluster similarity according to one or more embodiments.

Referring now to FIG. 14, illustrated is an example graph of localization error versus number of nearest RPs set in cluster similarity according to one or more embodiments. FIG. 14 depicts the error versus number of the nearest RPs (Q in Equation (20)) around the centroid for cluster similarity comparison. When Q is small, localization error is high due to signal statistical fluctuation. As Q increases, matching error decreases as more nearest neighbors (RPs) reduce the effect of signal fluctuation. When Q further increases, the improvement converges because the existing neighbors already sufficiently differentiate the clusters. Therefore, we select Q=5 in our baseline.

Figure 15:
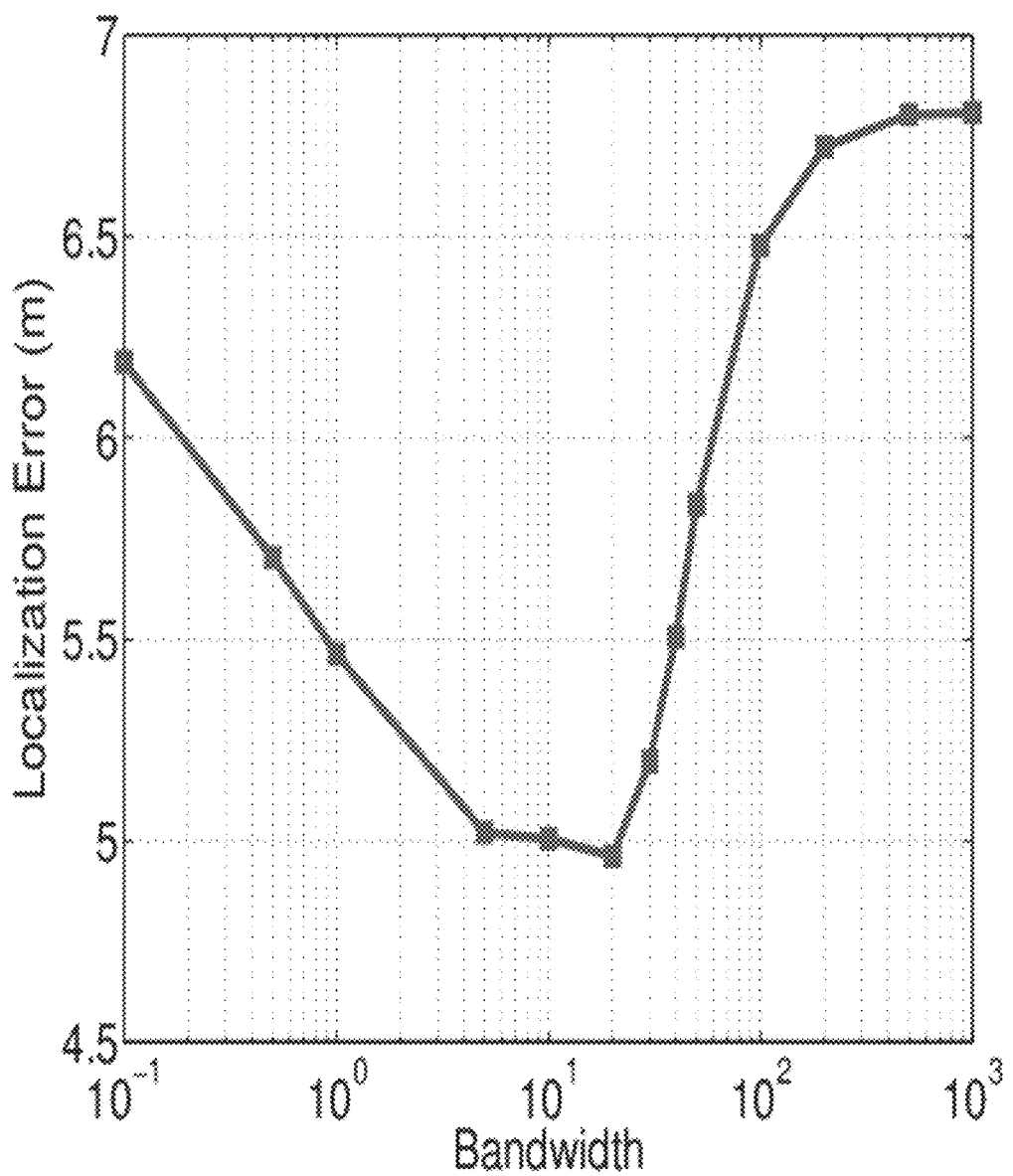
FIG. 15 illustrates an example graph of mean localization error versus bandwidth set in penalty term according to one or more embodiments.

Referring now to FIG. 15, illustrated is an example graph of mean localization error versus bandwidth set in penalty term according to one or more embodiments. FIG. 15 depicts the mean localization error versus the bandwidth b in penalty term (Equation (21)) As a Gaussian kernel is implemented, b can be varied in logarithmic scale. According to Equation (21), when b is very small, the penalty term $v_c$ is too sensitive to cluster size. When b increases, $v_c$ differs more sharply with cluster size, which helps differentiate the clusters. If b further increases, the performance decreases due to a uniform weight assignment with little differentiation of clusters. It dampens the improvement brought by cluster size weight $\rho_c$. Considering only average cluster similarity will bias to those clusters with small size. Therefore, there exists an optimal b for better cluster differentiation. In our experiment, we set b=5.

Figure 16:
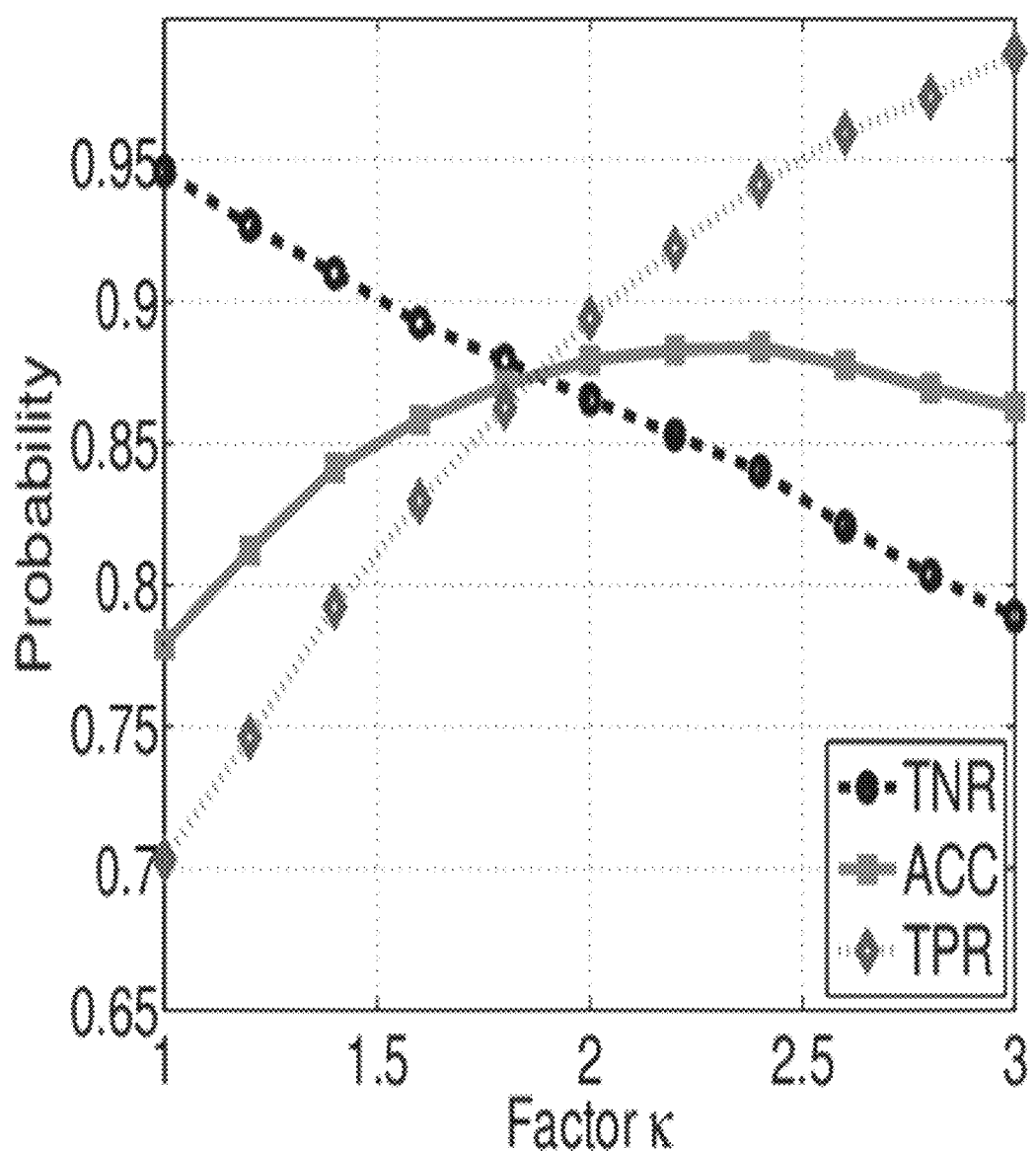
FIG. 16 illustrates an example graph of impact of factor κ in update decision according to one or more embodiments.
Figure 17:
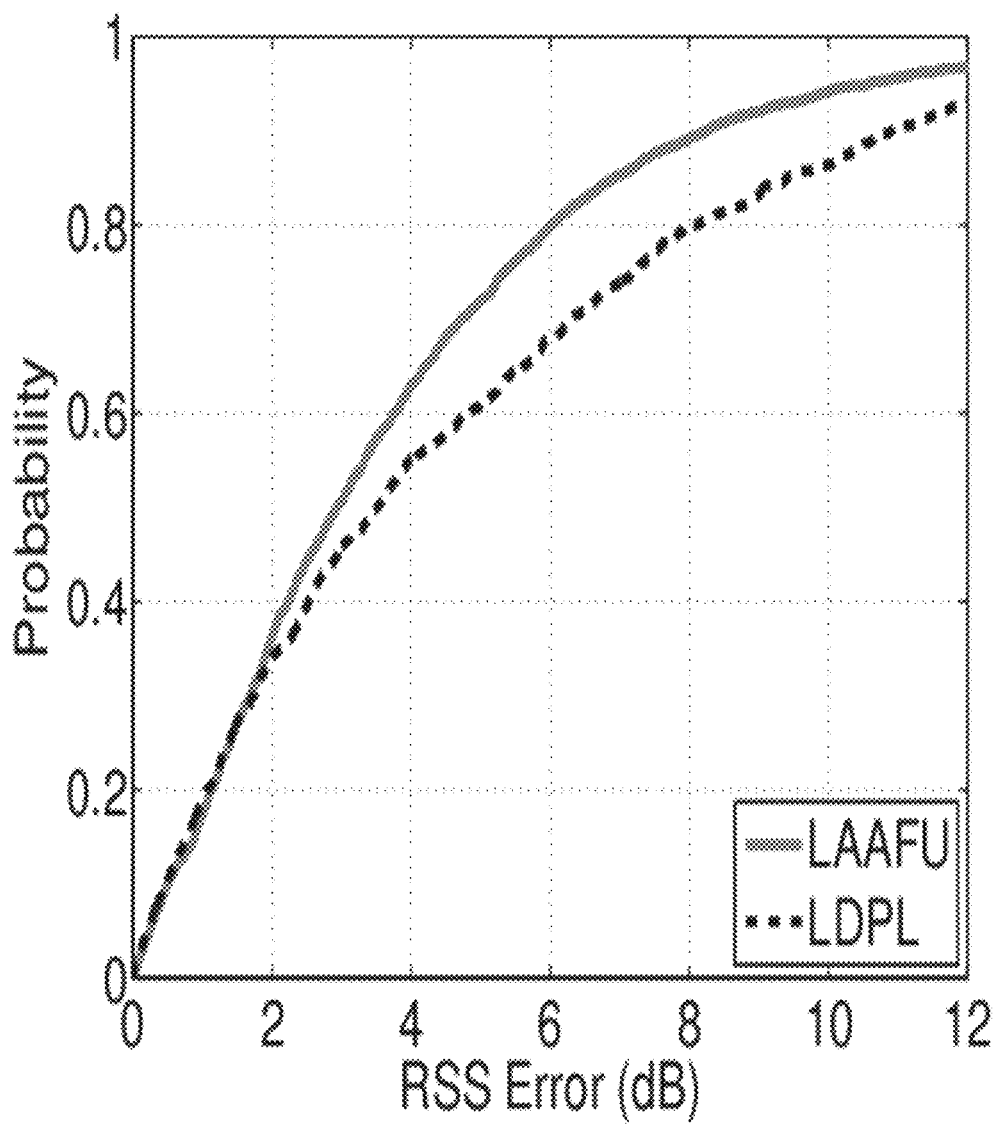
FIG. 17 illustrates an example cumulative distribution function graph of RSS regression error according to one or more embodiments.

Referring now to FIG. 16, illustrated is an example graph of impact of factor κ in update decision according to one or more embodiments. FIG. 16 depicts TNR, ACC and TPR versus the factor κ used in signal update decision. It shows that in general ACC increases first and then decreases, while TNR (TPR) generally decreases (increases). When κ is small, most of the data, that are identified as negative, are true negative, which leads to high TNR. TPR is small as the update decision is too sensitive to the temporal signal fluctuation. As κ increases, FN decreases while both TPR and ACC increase. As factor κ further increases, ACC begins to decrease because LAAFU may also identify positive cases as negative, leading to higher FP and lower TNR. Therefore the optimal κ=2 in this scenario Referring now to FIG. 17, illustrated is an example cumulative distribution function graph of RSS regression error according to one or more embodiments. FIG. 17 depicts the CDFs of RSS prediction errors using GP and traditional LDPL. The GP outperforms the LDPL in regressing the signal values of altered APs, as GP captures the local RSS distribution and preserves the overall signal propagation characteristics. LDPL simply regresses the RSSs using a path loss model and cannot truly reflect the ground-truth signals.

Figure 18:
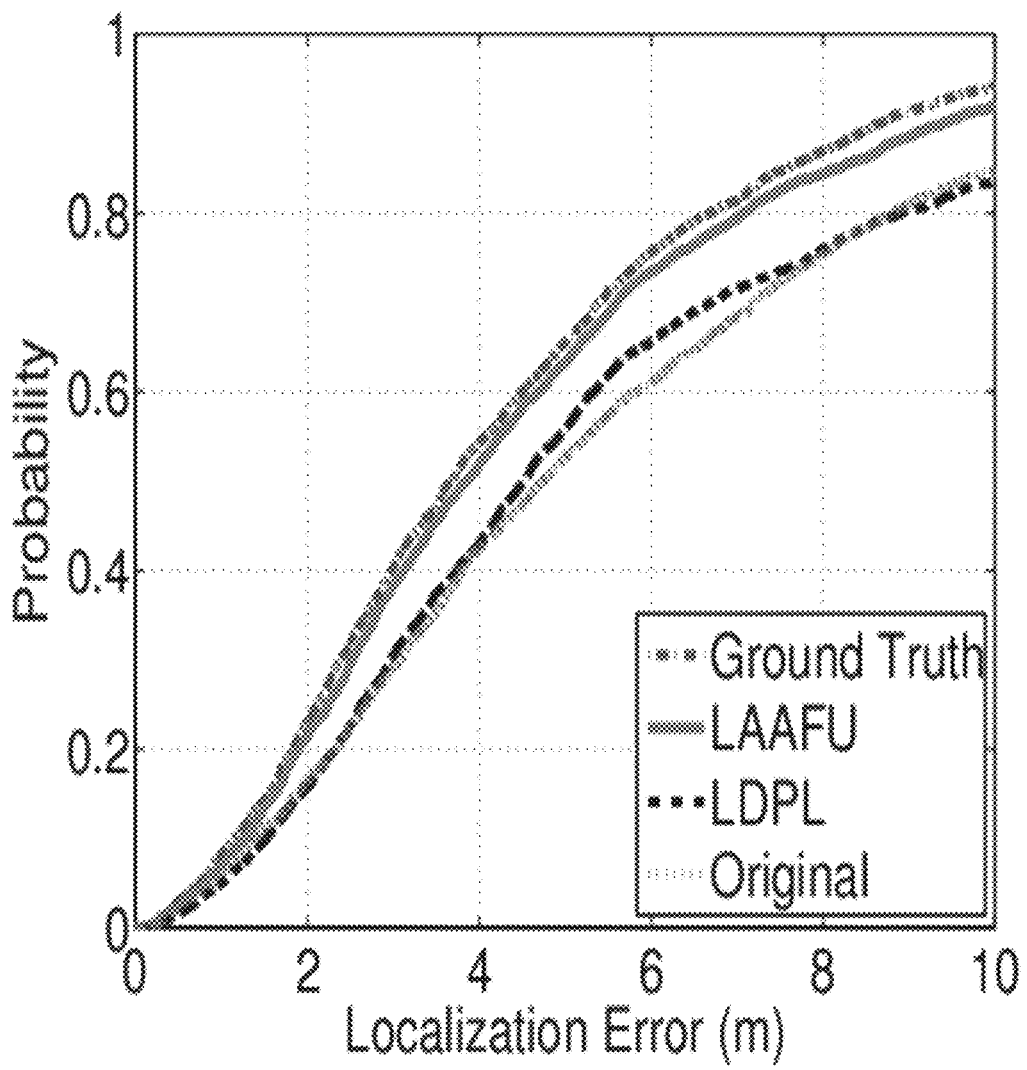
FIG. 18 an example cumulative distribution function graph of location error using updated signals according to one or more embodiments.

Referring now to FIG. 18, illustrated is an example cumulative distribution function graph of location error using updated signals according to one or more embodiments. FIG. 18 depicts the CDFs of WKNN errors using different fingerprint databases. The LAAFU system 100 can achieve error reduction compared with LDPL and successfully adapt the fingerprints closely towards the ground truth data under AP 106 alteration. It is mainly because GP regression in the LAAFU system 100 can adaptively learn the local RSS distributions of the altered APs 106. Traditional LDPL cannot reflect such local patterns due to wall partitioning.

Figure 19:
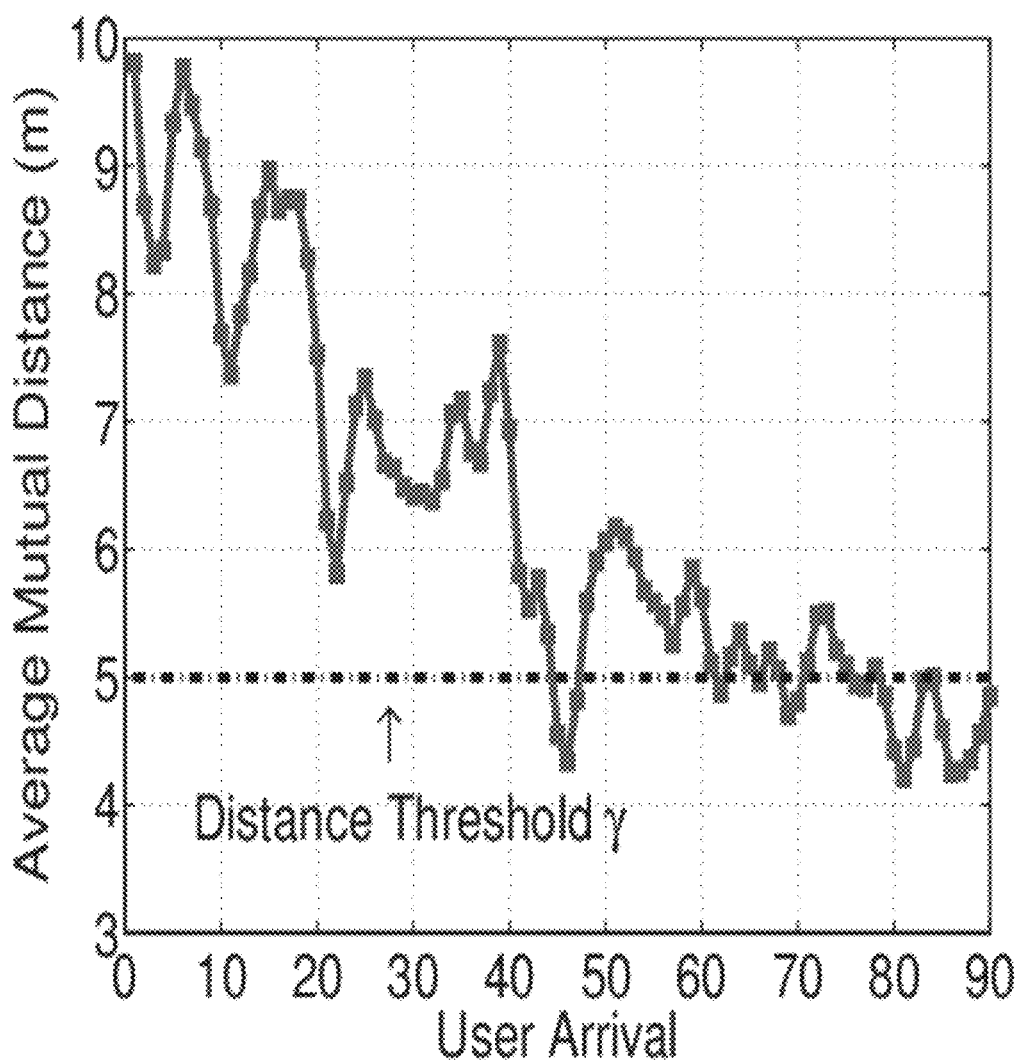
FIG. 19 illustrates an example graph of average mutual distance versus user arrival according to one or more embodiments.

Referring now to FIG. 19, illustrated is an example graph of average mutual distance versus user arrival according to one or more embodiments. FIG. 19 depicts the average mutual distance in fast detection versus temporal user arrivals. Updates can occur four times at index 20, 40, 60 and 80, respectively. Using Δ=0.5, the fingerprint can be adapted towards the ground-truth one, leading to smaller mutual distances. The LAAFU system 100 can identify altered APs 106 via subset sampling, and updates their fingerprint database using GP regression.

Figure 20:
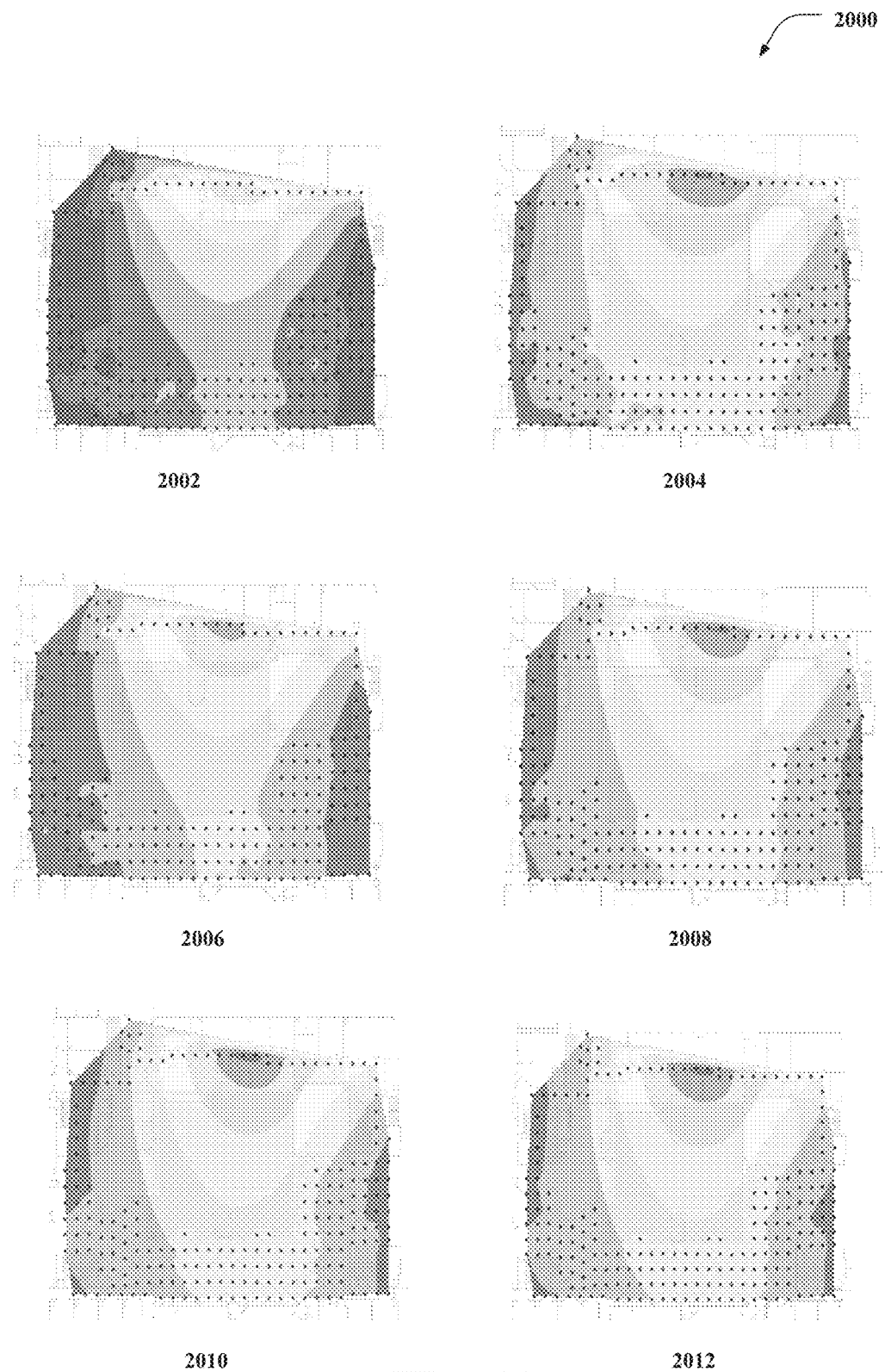
FIG. 20 illustrates example heat maps of access points according to one or more embodiments.

Referring now to FIG. 20, illustrated are example heat maps of access points according to one or more embodiments. To further illustrate the fingerprint update process, signal map changes for one of the altered APs 106 can be shown using heat maps 2002, 2004, 2006, 2008, 2010, 2012. The original signal map 2002 is before AP 106 alteration. Signal map 2004 is the ground truth signal map after one power adjustment. Temporal updates of its signal map with respect to index of temporal user arrivals can be represented by signal maps 2006, 2008, 2010, 2012. The signal maps gradually evolve towards the ground truth, and after 80 updates, the LAAFU system 100 can gradually learn the Wi-Fi signal map. Thereafter, the LAAFU system 100 can update the Wi-Fi fingerprints for better localization accuracy under altered APs 106.

Figure 21:
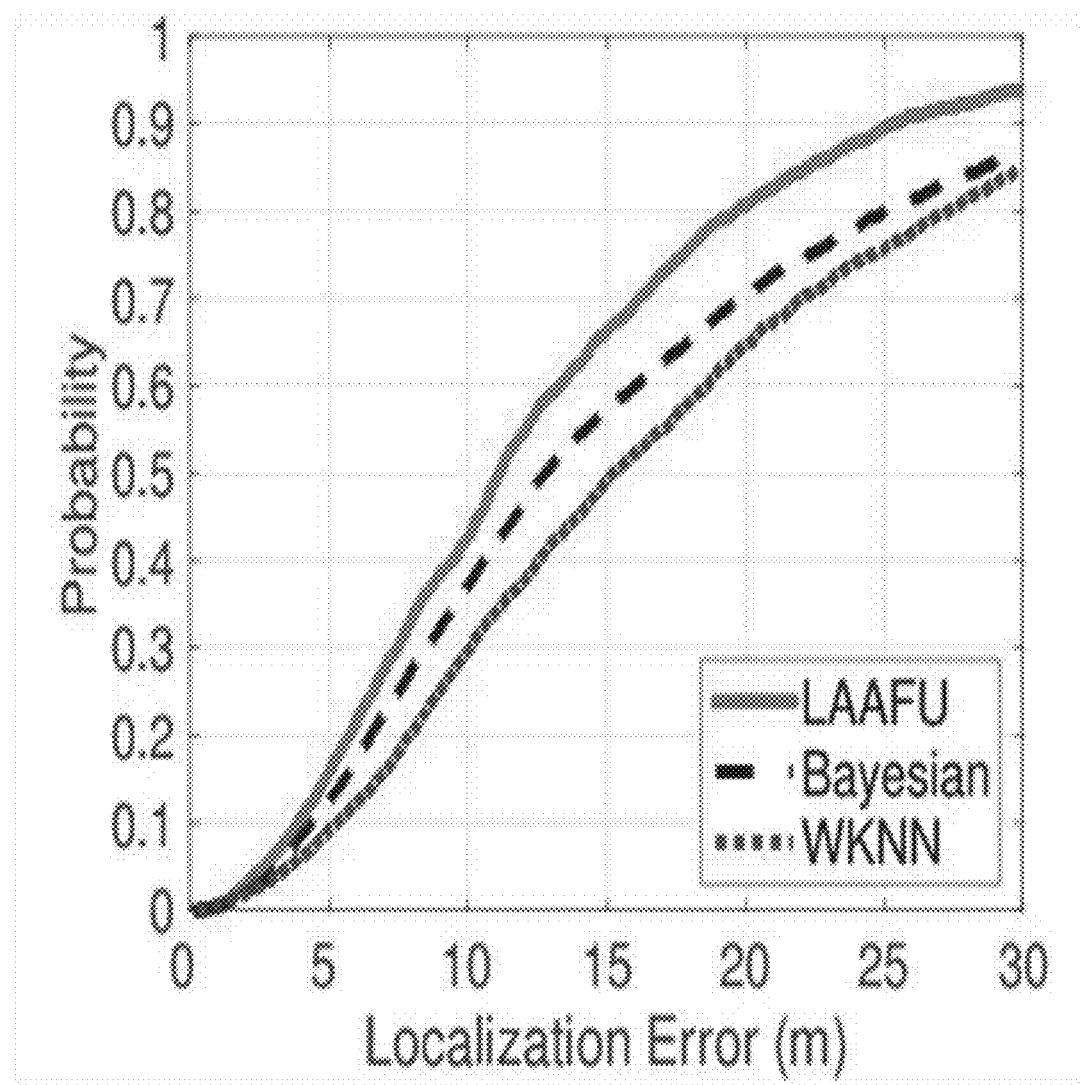
FIG. 21 illustrates an example cumulative distribution function graph of localization errors under AP alteration according to one or more embodiments.
Figure 22:
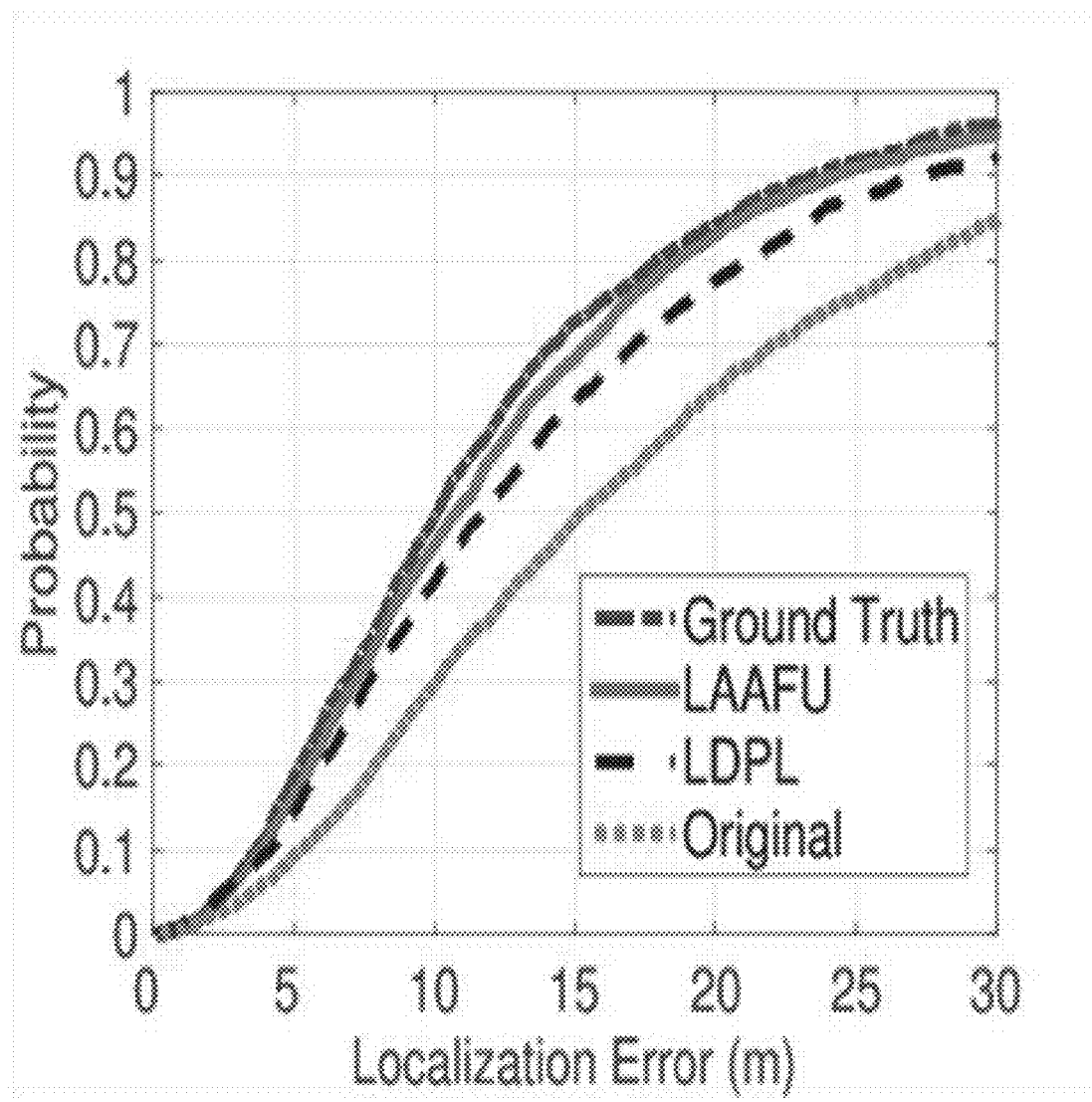
FIG. 22 illustrates an example cumulative distribution function graph of weighted k-nearest neighbor (WKNN) error using different databases according to one or more embodiments.
Figure 23:
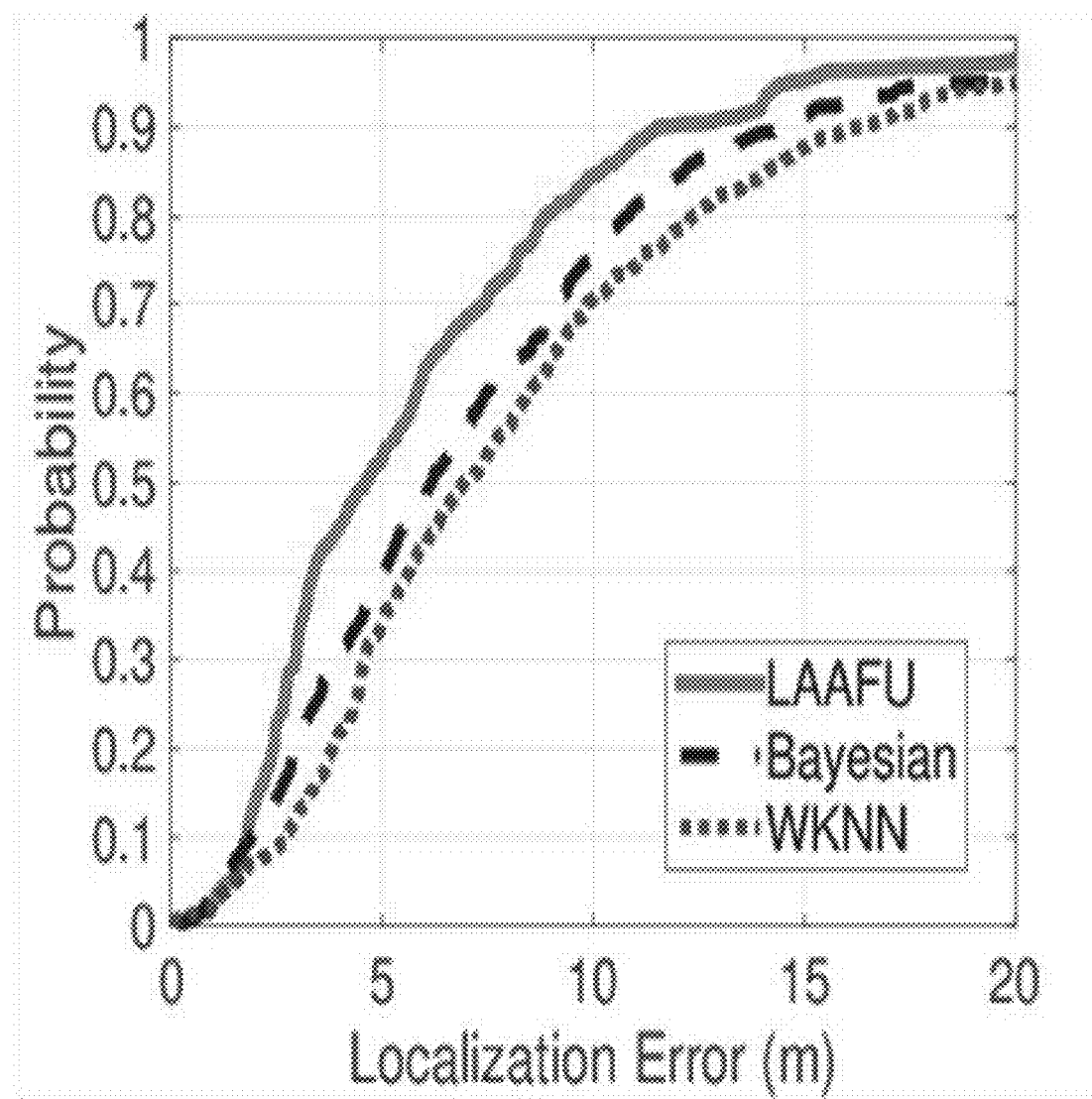
FIG. 23 illustrates an example cumulative distribution function graph of Location error using updated signals according to one or more embodiments.
Figure 24:
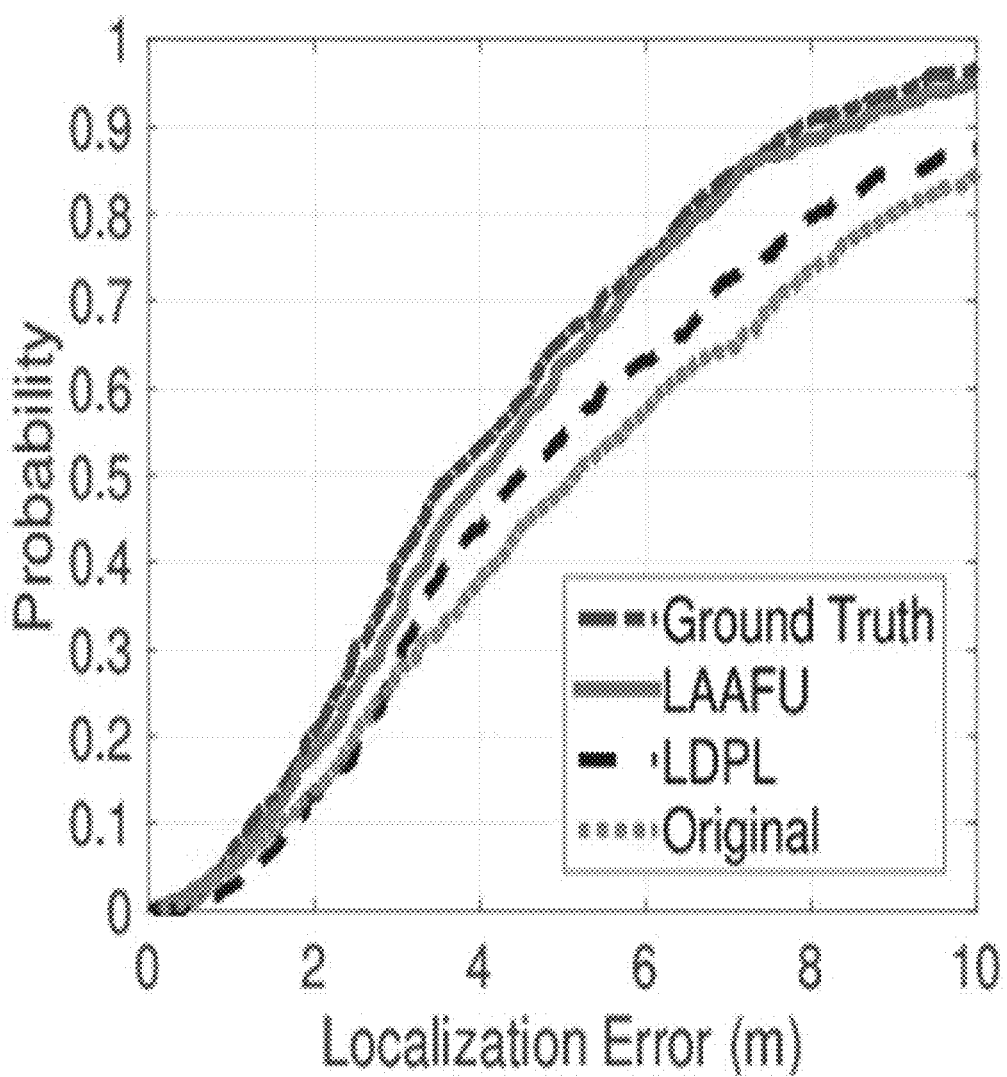
FIG. 24 illustrates an example cumulative distribution function graph of WKNN error using different databases according to one or more embodiments.

Referring now to FIGS. 21-24, illustrated is an example cumulative distribution function graph of localization errors under AP alteration according to one or more embodiments. FIGS. 21 and 22, show the localization error of the LAAFU system 100 and the location accuracy using the updated fingerprints from a first trial. Similar results have also been shown in FIGS. 23 and 24 from a second trial.

Figure 25:
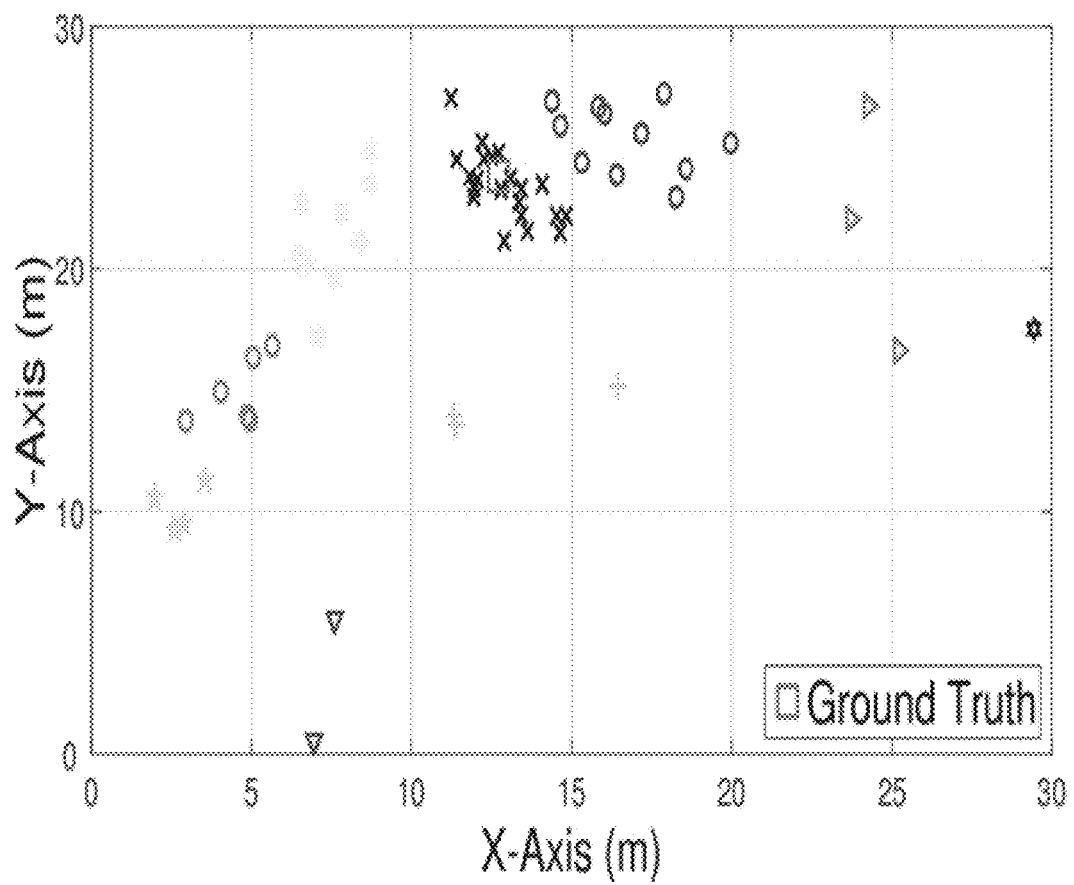
FIG. 25 illustrates an example of clustering locations into nine clusters according to one or more embodiments.
Figure 26:
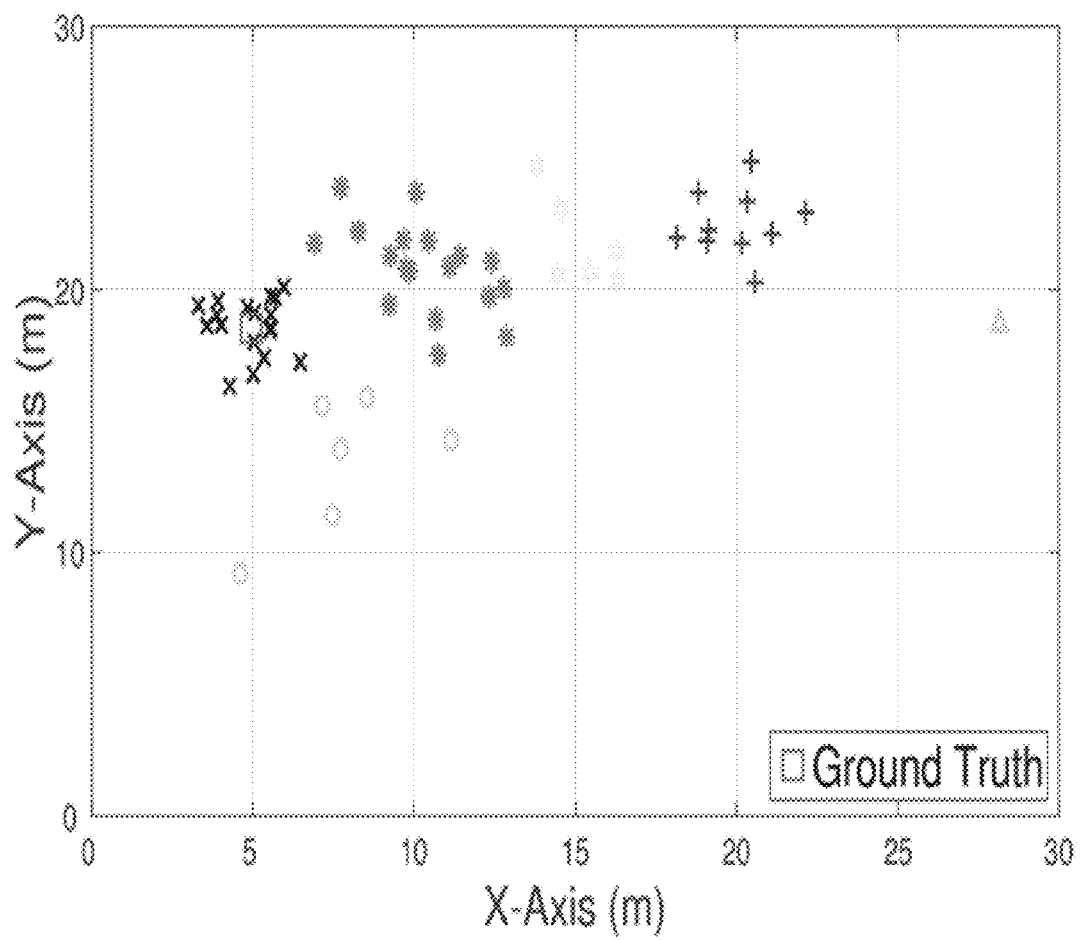
FIG. 26 illustrates an example of clustering locations into six clusters according to one or more embodiments.

Referring now to FIGS. 25-26, illustrated is an example of clustering locations according to one or more embodiments. FIG. 25-26 depict the results using affinity propagation clustering, where different number of clusters is generated adaptively. Note that any other suitable clustering algorithm can be applied in the LAAFU system 100.

Figure 27:
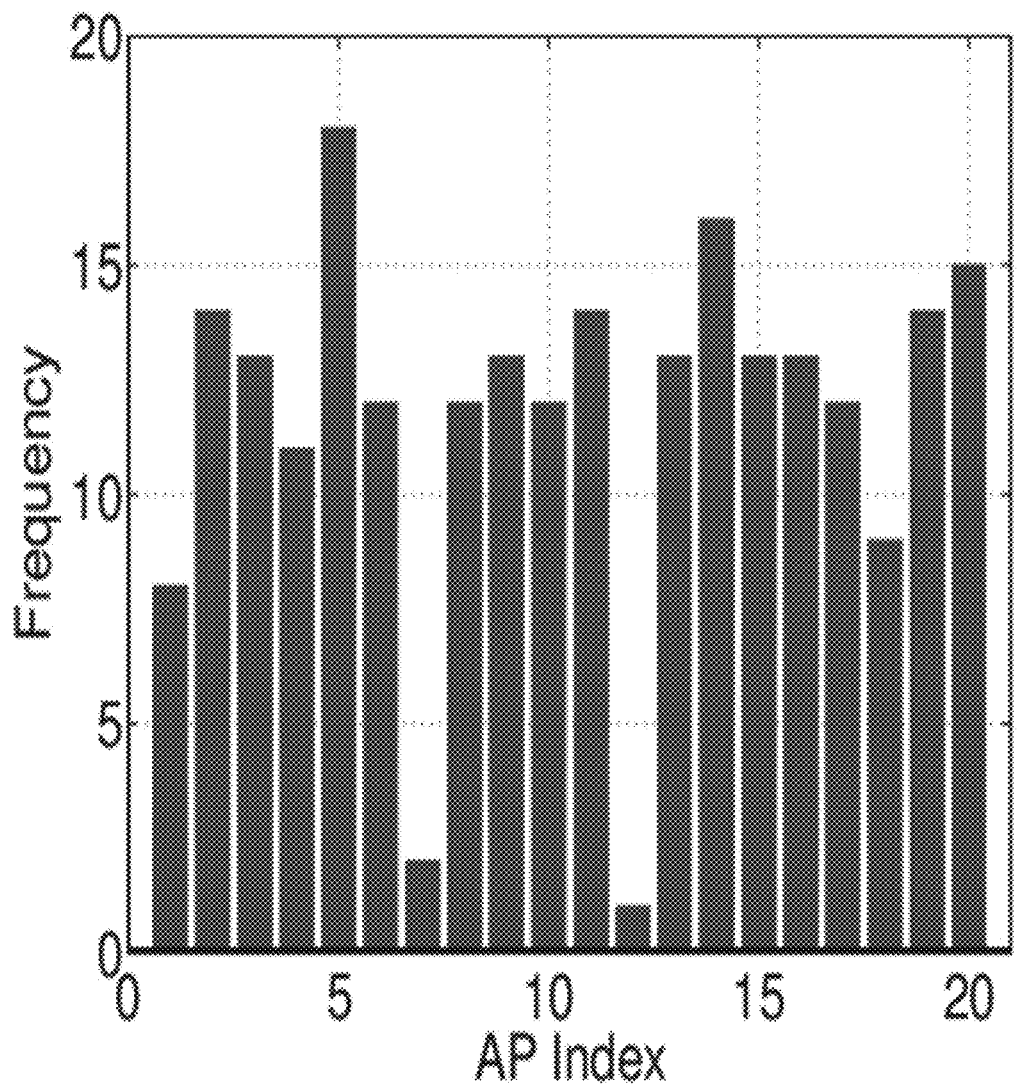
FIG. 27 illustrates an example graph of frequency in dense cluster versus index of APs detected by the client according to one or more embodiments.

Referring now to FIG. 27, illustrated is an example graph of frequency in dense cluster versus index of APs detected by the client according to one or more embodiments. FIG. 27 depicts a counting result, where the client detects overall 20 APs 106, while the size of the dense cluster is 23. As the frequency of the altered AP 106 is numerically distant from those of unaltered ones, a two-class clustering problem can arise in one dimension, which can be solved using Jenks natural breaks optimization method.

Figure 28:
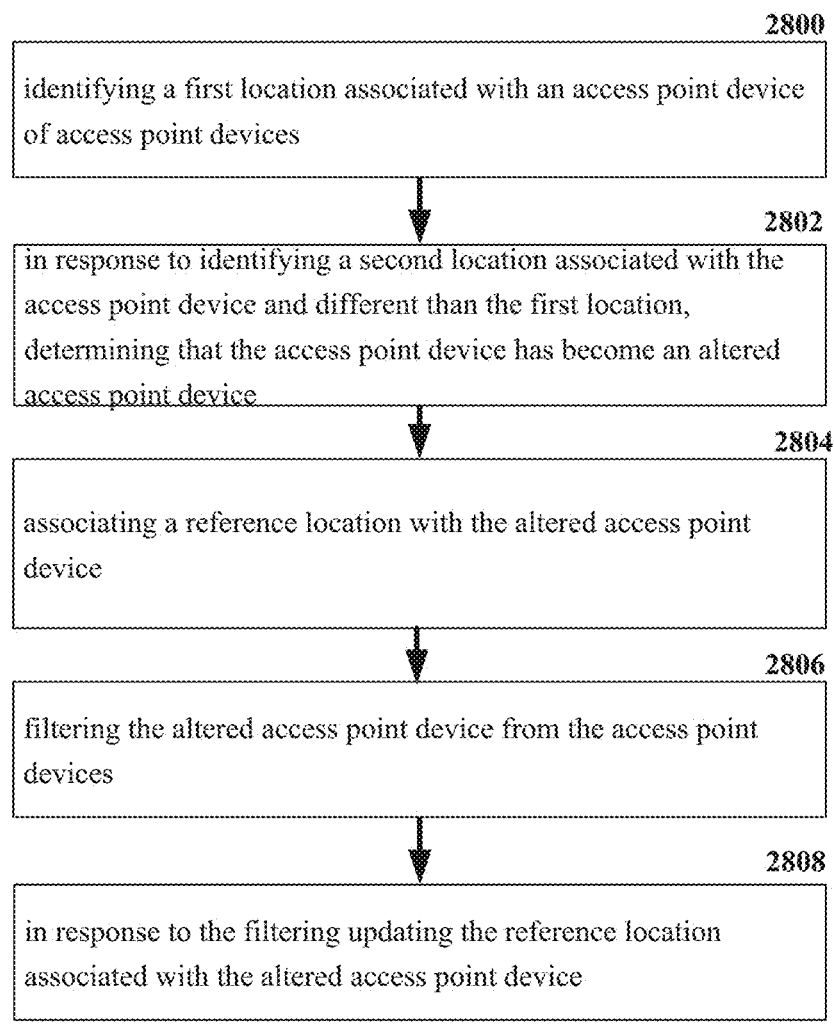
FIG. 28 illustrates an example flow diagram for a localization with altered APs and fingerprint updating (LAAFU) system according to one or more embodiments

Referring now to FIG. 28, illustrated is an example flow diagram for a LAAFU system according to one or more embodiments. At element 2800 the method can identify first location associated with an access point device of access point devices (e.g., via the mobile device 102). In response to identifying a second location associated with the access point device and different than the first location, the method can determine that the access point device has become an altered access point device at element 2802 (e.g., via the detection component 202). At element 2804 the method can associate a reference location with the altered access point device (e.g., via the localization component 210). At element 2806 the method can comprise filtering the altered access point device from the access point devices (e.g., via the localization component 210). Additionally, in response to the filtering, the method can comprise updating the reference location associated with the altered access point device (e.g., via the update component 218).

Figure 29:
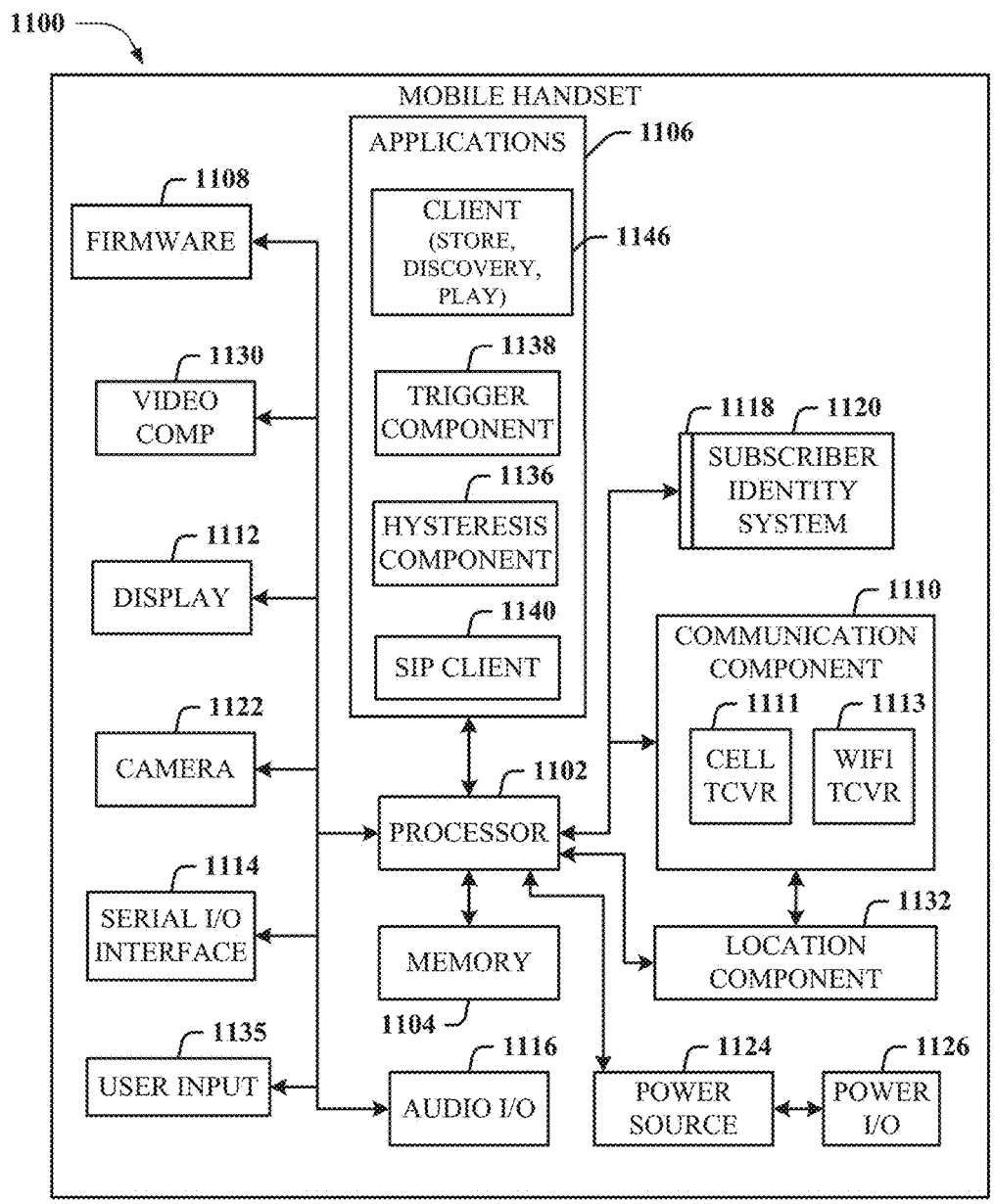
FIG. 29 illustrates an example block diagram of an example mobile handset operable to engage in a system architecture that facilitates secure wireless communication according to one or more embodiments described herein.

Referring now to FIG. 29, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 30:
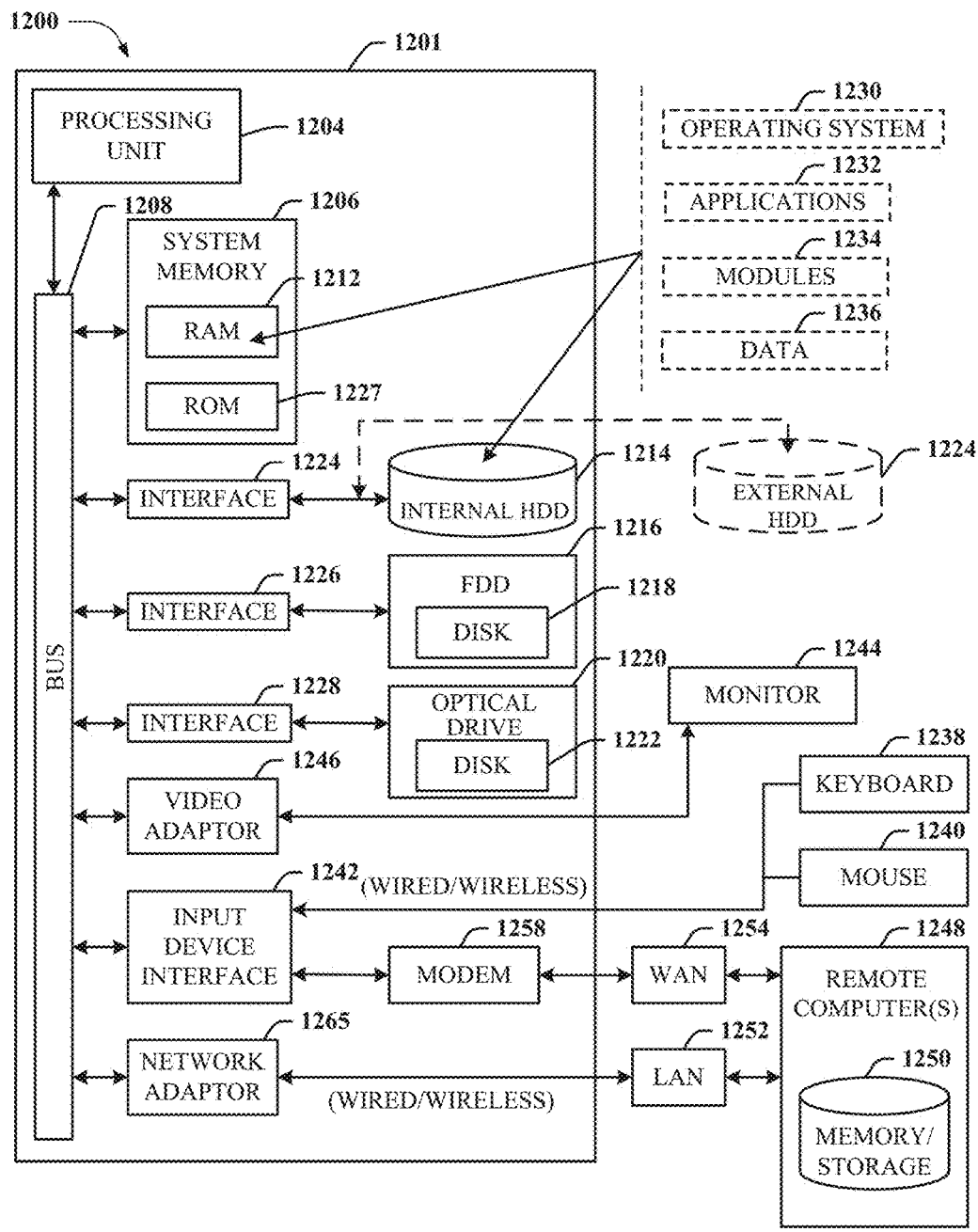
FIG. 30 illustrates an example block diagram of an example computer operable to engage in a system architecture that facilitates secure wireless communication according to one or more embodiments described herein.

Referring now to FIG. 30, there is illustrated a block diagram of a computer 1200 operable to execute a system architecture that facilitates establishing a transaction between an entity and a third party. The computer 1200 can provide networking and communication capabilities between a wired or wireless communication network and a server and/or communication device. In order to provide additional context for various aspects thereof, FIG. 30 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 30, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by a wireless network device comprising a processor, a first location associated with an access point device of access point devices;
   in response to identifying a second location associated with the access point device and different than the first location, determining, by the wireless network device, that the access point device has become an altered access point device;
   associating, by the wireless network device, a reference location with the altered access point device;
   applying, by the wireless network device, a Gaussian regression analysis to the reference location;
   filtering, by the wireless network device, the altered access point device from the access point devices; and
   in response to the filtering, updating, by the wireless network device, the reference location associated with the altered access point device.

2. The method of claim 1, wherein the filtering comprises partitioning a received signal strength into a group of received signal strengths.

3. The method of claim 2, further comprising:
weighting, by the wireless network device, the group of received signal strengths according to a signal strength similarity of the group of received signal strengths.

4. The method of claim 3, further comprising:
regressing, by the wireless network device, the group of received signal strengths to reflect an access point environment associated with the access point devices.

5. The method of claim 4, wherein the regressing comprises applying a Gaussian regression.

6. The method of claim 4, further comprising:
in response to the regressing, updating, by the wireless network device, a data structure associated with the access point devices.

7. The method of claim 6, wherein the updating comprises updating based on feedback received from on user input.

8. A system, comprising:
a processor; and
a memory that stores executable instructions that, when executed by the processor, facilitate performance of operations, comprising:
identifying a first power associated with an access point device of access point devices;
in response to identifying a second power associated with the access point device and different than the first power, determining that the access point device has become an altered access point device;
estimating a likelihood of an altered access point signal associated with the altered access point device;
grouping received signal strengths associated with the access point devices, resulting in grouped signal strengths;
based on the grouped signal strengths, estimating corresponding locations associated with the access point devices, resulting in estimated corresponding locations;
applying a Gaussian regression analysis to the estimated corresponding locations;
in response to determining a first location of a mobile device, identifying a second location associated with the altered access point device; and
updating a data store with a received signal strength associated with the altered access point device relative to the first location of the mobile device.

9. The system of claim 8, wherein the identifying the second location is associated with determining a density of the grouped signal strengths.

10. The system of claim 9, wherein the operations further comprises:
in response to the identifying the second location associated with the altered access point device, identifying the altered access point device.

11. The system of claim 9, wherein the operations further comprises:
associating the received signal strengths with the estimated corresponding locations.

12. The system of claim 11, wherein the associating comprises employing a Gaussian process regression.

13. A non-transitory machine-readable storage medium, comprising executable instructions that, when executed by a processor, facilitate performance of operations, comprising:
identifying a first power associated with an access point device of access point devices;
in response to identifying a second power associated with the access point device that is different than the first power, determining that the access point device has become an altered access point device;
measuring received signal strengths from the access point devices;
based on the received signal strengths, grouping the access point devices, resulting in grouped access point devices;
in response to the grouping of the access point devices, estimating a location of the altered access point device resulting in an estimated location; and
applying a regression analysis to the estimated location of the altered access point device.

14. The non-transitory machine-readable storage medium of claim 13, wherein the operations further comprise:
weighting the received signal strengths according to a signal strength similarity of the received signal strengths.

15. The non-transitory machine-readable storage medium of claim 14, wherein the regression analysis comprises a Gaussian regression analysis.

16. The non-transitory machine-readable storage medium of claim 15, wherein the operations further comprise:
in response to the applying the regression analysis, verifying the estimated location of the altered access point device.

17. The non-transitory machine-readable storage medium of claim 16, wherein the verifying comprises comparing the estimated location to a previously stored location associated with the altered access point device.

18. The non-transitory machine-readable storage medium of claim 17, wherein the operations further comprise:
in response to the comparing the estimated location to the previously stored location associated with the altered access point device, updating a data structure.

19. The non-transitory machine-readable storage medium of claim 13, wherein the location is a first location, wherein the operations further comprise:
determining a second location associated with a mobile device, and wherein the second location is used to determine the estimated location.

20. The non-transitory machine-readable storage medium of claim 13, wherein the location is a first location, wherein the operations further comprise:
estimating a second location associated with the grouped access point devices, and wherein the second location is used to determine the estimated location.

* * * * *